US012722918B2

(12) United States Patent
Nakata et al.

(10) Patent No.: US 12,722,918 B2
(45) Date of Patent: Sep. 1, 2026

(54) MEDIUM PLACEMENT UNIT, TRANSPORT DEVICE, AND PRINTING DEVICE

(71) Applicant: SEIKO EPSON CORPORATION, Tokyo (JP)

(72) Inventors: Satoshi Nakata, Matsumoto (JP); Hirokazu Anada, Matsumoto (JP); Masanari Tanaka, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/429,770

(22) Filed: Feb. 1, 2024

(65) Prior Publication Data

US 2024/0262644 A1 Aug. 8, 2024

(30) Foreign Application Priority Data

Feb. 8, 2023 (JP) ................................ 2023-017397

(51) Int. Cl.

| | |
|---|---|
| ***B65H 1/26*** | (2006.01) |
| ***B41J 13/03*** | (2006.01) |
| ***B41J 13/10*** | (2006.01) |
| ***B65H 1/04*** | (2006.01) |

(52) U.S. Cl.

CPC .............. *B65H 1/266* (2013.01); *B41J 13/03* (2013.01); *B41J 13/103* (2013.01); *B65H 1/04* (2013.01); *B65H 2404/60* (2013.01)

(58) Field of Classification Search

CPC .. B65H 1/04; B65H 1/266; B65H 2301/3621; B65H 2301/36212; B65H 2301/363; B65H 2301/4222; B65H 2405/112; B65H 2405/1122; B65H 2405/11161;

(Continued)

(56) References Cited

U.S. PATENT DOCUMENTS

| | | | | |
|---|---|---|---|---|
| 8,045,216 | B2 * | 10/2011 | Kobayashi | B65H 1/266 358/1.9 |
| 9,938,095 | B2 * | 4/2018 | Kaiga | B65H 1/266 |
| 9,957,122 | B2 * | 5/2018 | Koga | B65H 1/04 |

(Continued)

FOREIGN PATENT DOCUMENTS

| | | |
|---|---|---|
| JP | H07101561 A | 4/1995 |
| JP | 2001328729 A | 11/2001 |

(Continued)

*Primary Examiner* — Ernesto A Suarez
(74) *Attorney, Agent, or Firm* — CHIP LAW GROUP

(57) ABSTRACT

A medium placement unit including a placement surface on which a medium is placed and a restriction section that is movable relatively with respect to the placement surface in each of a first direction and a second direction and that restricts movement of the medium, wherein the restriction section has a first portion and a second portion, the placement surface is provided with a plurality of third portions arranged in parallel to the first direction and a fourth portion that engages with the restriction section, when the plurality of third portions engage with the first portion, it restricts movement of the restriction section in the first and second directions, the fourth portion is provided at a position corresponding to a predetermined size medium, the restriction section can change the third portion that engages the first portion while maintaining the state of the second portion engaging with the fourth portion.

19 Claims, 15 Drawing Sheets

(58) Field of Classification Search
CPC .. B65H 2405/1142; B65H 2405/11425; B65H 2405/12; B65H 2511/11; B65H 2511/12
See application file for complete search history.

(56) References Cited

U.S. PATENT DOCUMENTS

| | | | | |
|---|---|---|---|---|
| 10,377,589 | B2 * | 8/2019 | Fuse | B65H 1/266 |
| 10,479,627 | B2 * | 11/2019 | Ishida | B65H 1/266 |
| 10,865,060 | B2 * | 12/2020 | Fuse | B65H 1/266 |
| 2007/0196150 | A1 | 8/2007 | Kobayashi | |
| 2010/0052247 | A1 | 3/2010 | Kaseda | |
| 2017/0313530 | A1 | 11/2017 | Fuse et al. | |
| 2019/0070869 | A1 | 3/2019 | Nakahata et al. | |

FOREIGN PATENT DOCUMENTS

| | | | |
|---|---|---|---|
| JP | 2005041646 | A | 2/2005 |
| JP | 2007223686 | B | 4/2011 |
| JP | 2010052858 | B | 5/2011 |
| JP | 2013227158 | B | 12/2014 |
| JP | 2013133173 | B | 4/2015 |
| JP | 2017030896 | A1 | 6/2018 |
| JP | 2016113300 | B2 | 1/2021 |
| JP | 2019043736 | B | 11/2021 |

* cited by examiner

MEDIUM PLACEMENT UNIT, TRANSPORT DEVICE, AND PRINTING DEVICE

The present application is based on, and claims priority from JP Application Serial Number 2023-017397, filed Feb. 8, 2023, the disclosure of which is hereby incorporated by reference herein in its entirety.

BACKGROUND

1. Technical Field

The present disclosure relates to a medium placement unit, a transport device, and a printing device.

2. Related Art

Research and development have been conducted on a unit on which is placed a medium to be fed to a printing device or the like that prints an image on a print medium.

In this regard, there is known a paper feed cassette of a printing device capable of setting a plurality of types of standard-size and nonstandard-size medium. The paper feed cassette includes a guide member that can reciprocate to set the medium at a predetermined position, a first locking claw and a second locking claw provided on the guide member, a plurality of first concave sections that are provided at positions corresponding to the plurality of standard sizes, that are spaced apart from each other, and that are for restricting movement of the guide member in at least one of the reciprocating directions by engaging with the first locking claw, and, in order to deal with nonstandard sizes, a plurality of second concave sections that are provided at intervals narrower than intervals between adjacent first concave sections and that are for restricting movement of the guide member in at least one of the reciprocating directions by engaging with the second locking claw (refer to JP-A2005-041646).

In the paper feed cassette described in JP-A2005-041646, when a medium of a standard size is set, the guide member can be moved such that the first locking claw engages with a first concave section. Here, even when the medium are sheets of the same standard size, the sizes of the sheets may differ from each other due to their cutting tolerance. For this reason, in the paper feed cassette, the first concave section is provided so that the position of the guide member is located at a position where movement of the medium having a size slightly larger than the standard size can be restricted. As a result, in the paper feed cassette, even when the guide member is moved so that the first locking claw engages with the first concave section, the position of the guide member and the position of the end section of the medium may be misaligned. The occurrence of such deviation is not desirable because it leads to the occurrence of skew, sheet feeding failure, and the like when the medium is transported. However, in the paper feed cassette, since the first concave section has the same shape as the second concave section and restricts movement of the guide member, it is sometimes difficult to finely adjust the position of the guide member in accordance with cutting tolerance.

SUMMARY

According to an aspect of the present disclosure for overcoming the above-described problem, a medium placement unit includes a placement surface on which a medium is placed and a restriction section that is movable relative to the placement surface in both a first direction, in which the restriction section approaches the medium placed on the placement surface, and in a second direction opposite to the first direction, and that restricts movement of the medium placed on the placement surface by engaging with the placement surface, wherein the restriction section includes a first portion and a second portion and is engageable with the placement surface via at least one of the first portion and the second portion, the placement surface is provided with a plurality of third portions arranged in parallel with the first direction and a fourth portion, the first portion is engageable with each of the plurality of third portions and when engaged with a third portion, movement of the restriction section in the first direction and in the second direction is restricted, the second portion is engageable with the fourth portion, the fourth portion is provided at a position corresponding to a medium of a predetermined size, and the restriction section is configured to, when the first portion and the third portion are engaged in a state where the second portion and the fourth portion are engaged, switch the third portion that is engaged with the first portion while maintaining the state where the second portion and the fourth portion are engaged.

An aspect of the present disclosure is a transport device including the above medium placement unit and a transport section that transports the medium placed on the placement surface of the medium placement unit in a transport direction, wherein the first direction is the transport direction.

An aspect of the present disclosure is a transport device including the above medium placement unit and a transport section that transports the medium placed on the placement surface of the medium placement unit in a transport direction, wherein the first direction is a direction intersecting with the transport direction.

An aspect of the present disclosure is a printing device including the above medium placement unit, a transport section that transports the medium placed on the placement surface of the medium placement unit as a print medium, and a printing section configured to perform printing on the print medium transported by the transport device.

DESCRIPTION OF EMBODIMENT

Embodiment

Figure 1:
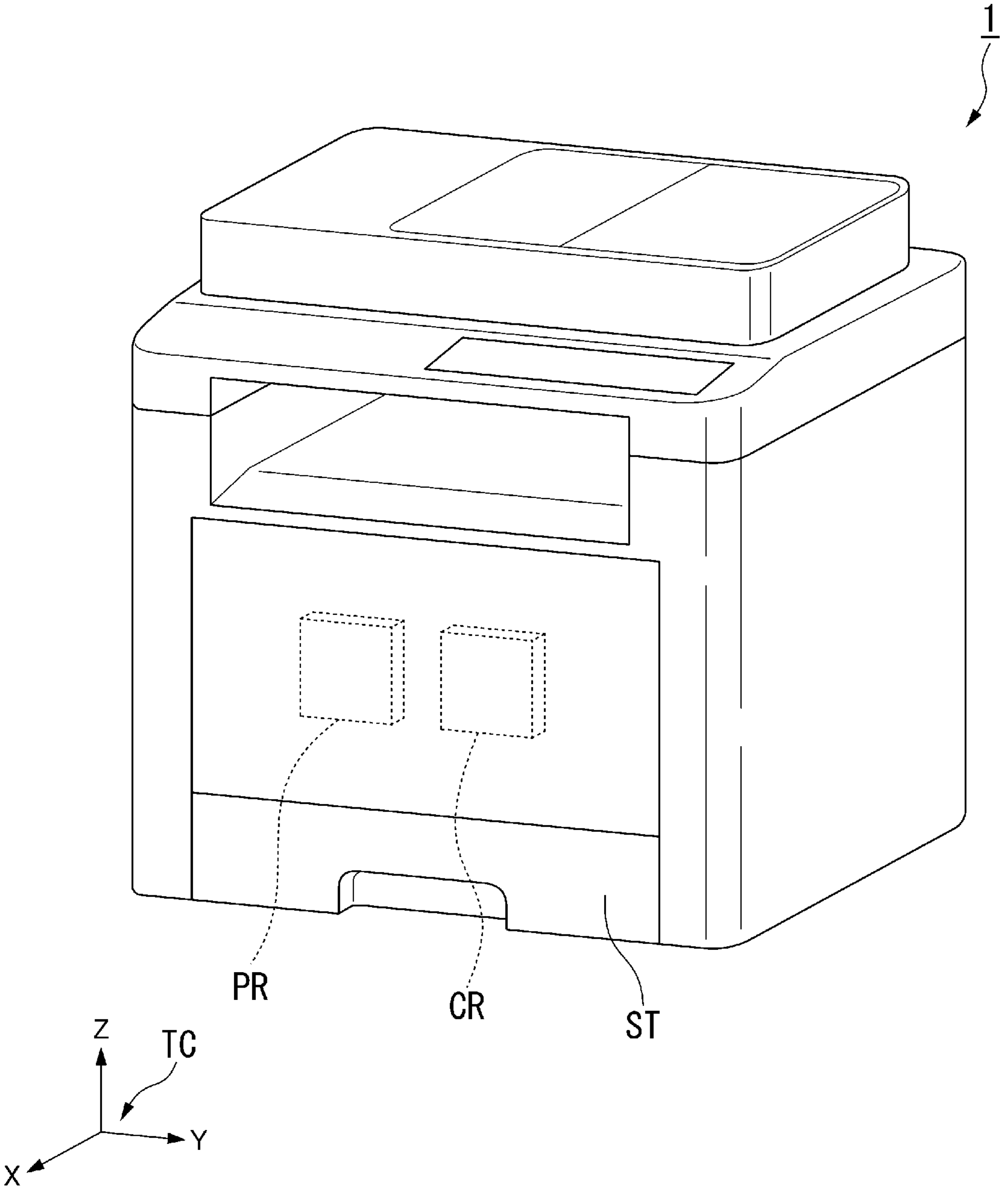
FIG. 1 is a diagram illustrating an example of an external appearance of a printing device 1.

Hereinafter, embodiments of the present disclosure will be described with reference to the drawings.

Overview of Printing Device

First, an overview of a printing device according to an embodiment will be described.

The printing device according to the embodiment includes a medium placement unit, a transport section, and a printing section. The medium placement unit includes a placement surface and a restriction section. The placement surface is a surface on which a medium is placed. The restriction section is movable relative to the placement surface in each of a first direction and a second direction. The first direction is a direction approaching the medium placed on the placement surface. The second direction is a direction opposite to the first direction. The restriction section restricts movement of the medium placed on the placement surface by engaging with the placement surface. The restriction section includes a first portion and a second portion and is engageable with the placement surface via at least one of the first portion and the second portion. Here, the placement surface is provided with a plurality of third portions arranged in parallel with the first direction and a fourth portion. Each of the plurality of third portions is engageable with the first portion and restricts movement of the restriction section in the first direction and in the second direction when engaged with the first portion. The fourth portion is engageable with the second portion and is provided at a position corresponding to a medium of a predetermined size. When one third portion of the plurality of third portions is engaged with the first portion in a state where the second portion is engaged with the fourth portion, the restriction section can, while maintaining the state where the second portion is engaged with the fourth portion, switch the third portion that is engaged with the first portion for a third portion adjacent to the one third portion of the plurality of third portions. The transport section transports, as a print medium, a medium placed on the placement surface of the medium placement unit. The printing section performs printing on the print medium transported by the transport device. By this, the printing device and the medium placement unit included in the printing device can finely adjust the position of the restriction section by the engagement between the first portion and any one of the plurality of third portions, can inform the user that the fourth portion and the second portion are engaged with each other at the position corresponding to the medium of the predetermined size by sound or the like, and as a result, can urge that the position of the restriction section with respect to the medium be finely adjusted by engagement of the first portion with one of the third portions. That is, the printing device and the medium placement unit included in the printing device can suppress the occurrence of skew, paper feeding failure, and the like in the transport of a medium of a predetermined size, among the medium placed on the placement surface.

Hereinafter, configuration of a printing device according to an embodiment and configuration of a medium placement unit included in the printing device will be described in detail. Note that, as will be described later, the medium placement unit included in the printing device may be included, instead of in the printing device, in another electronic apparatus that performs various processes using the medium placed on the medium placement unit.

Configuration of Printing Device

Hereinafter, the configuration of the printing device according to the embodiment will be described by taking a printing device 1 as an example.

FIG. 1 is a diagram illustrating an example of an external appearance of the printing device 1.

Here, a three dimensional coordinate system TC is a three dimensional orthogonal coordinate system indicating directions in the drawings in which the three dimensional coordinate system TC is drawn. Hereinafter, for convenience of description, the X-axis in the three dimensional coordinate system TC is simply referred to as the X-axis. Hereinafter, for convenience of description, the Y-axis in the three dimensional coordinate system TC will be simply referred to as the Y-axis. Hereinafter, for convenience of description, the Z-axis in the three dimensional coordinate system TC will be simply referred to as the Z-axis. Hereinafter, as an example, a case will be described wherein the negative direction of the Z-axis coincides with the gravity direction. Therefore, hereinafter, for convenience of description, the positive direction of the Z-axis will be referred to as an upward direction or simply as upward, and the negative direction of the Z-axis will be referred to as a downward direction or simply as downward.

Hereinafter, for convenience of description, a surface on the positive direction side of the X-axis among the surfaces of the printing device 1 will be referred to as the front surface of the printing device 1 and a surface on the negative direction side of the X-axis among the surfaces of the printing device 1 will be referred to as the rear surface of the printing device 1. Hereinafter, for convenience of description, a surface on the positive direction side of the Y-axis among the surfaces of the printing device 1 will be referred to as the right surface of the printing device 1 and a surface on the negative direction side of the Y-axis among the surfaces of the printing device 1 will be referred to as the left surface of the printing device 1. Hereinafter, for convenience of description, a surface on the positive direction side of the Z-axis among the surfaces of the printing device 1 will be referred to as the upper surface of the printing device 1 and a surface on the negative direction side of the Z-axis among the surfaces of the printing device 1 will be referred to as the lower surface of the printing device 1.

The printing device 1 prints an image on a medium. The printing device 1 is, for example, an ink jet printer. Hereinafter, for convenience of description, a medium on which an image is printed in the printing device 1 will be referred to as a print medium. The print medium may be any medium as long as it is a sheet-like medium such as a paper sheet to be printed on or a sticker sheet. Note that the printing device 1 may be a printer of another type, such as a laser printer or a multifunction peripheral.

The printing device 1 includes, for example, a medium placement unit ST, a transport section CR, and a printing section PR. Note that the printing device 1 may be configured to include other members, other devices, and the like in addition to the medium placement unit ST, the transport section CR, and the printing section PR. In FIG. 1, in order to prevent the drawing from being complicated, the transport section CR and the printing section PR are illustrated as rectangular parallelepiped objects. The printing device 1 may not include the medium placement unit ST.

The medium placement unit ST is, for example, a paper feed cassette of the printing device 1. The medium placement unit ST can be attached to the printing device 1 and detached from the printing device 1. In other words, the medium placement unit ST is detachable from the printing device 1. The print medium is placed on the medium placement unit ST. The print medium placed on the medium placement unit ST is supplied to the printing section PR by being transported by the transport section CR.

Figure 2:
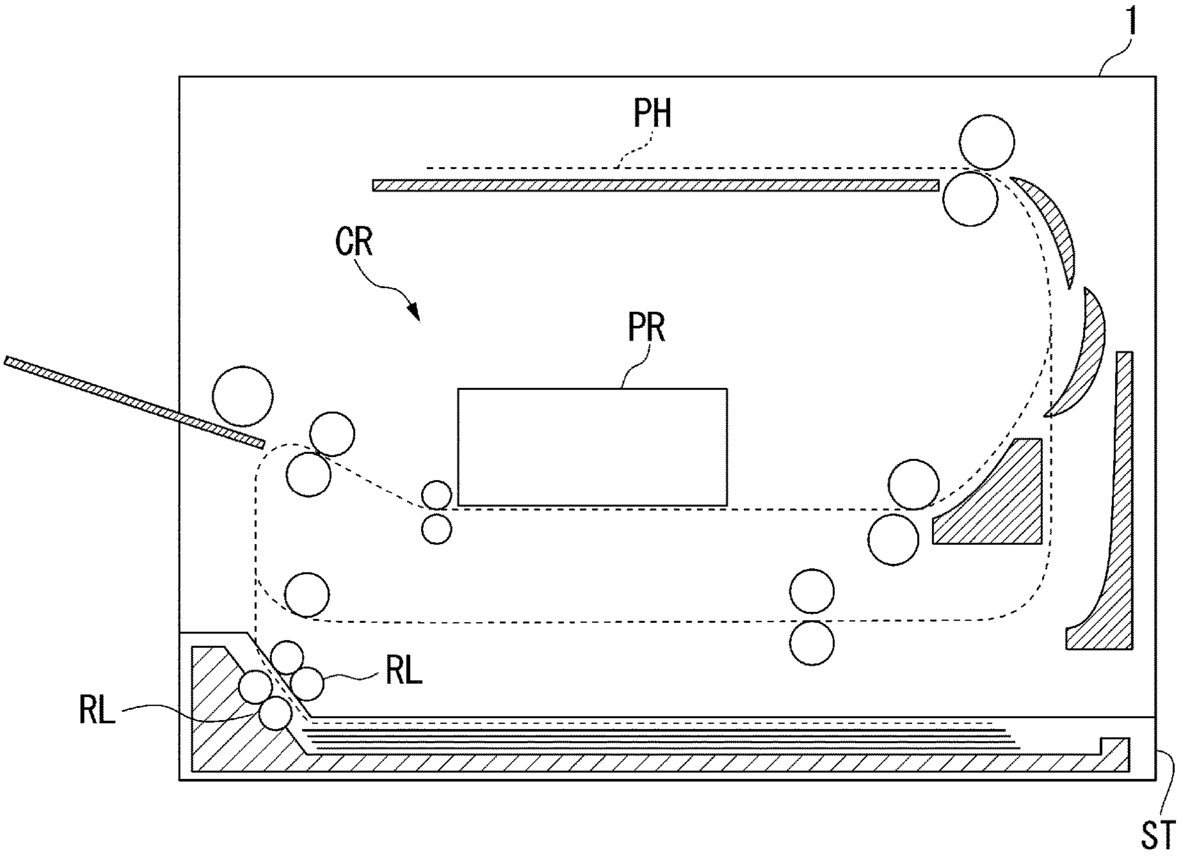
FIG. 2 is a diagram illustrating examples of a transport section CR and a printing section PR provided in the printing device 1.

Here, FIG. 2 is a diagram illustrating examples of a transport section CR and a printing section PR provided in the printing device 1. Each "o" shown in FIG. 2 is a roller which is used for transporting the print medium in the printing device 1. The transport section CR includes these rollers, a motor (not shown) for rotating the rollers, and gears (not shown) for transmitting the driving force of the motor to the rollers. The transport section CR, for example, transports the print medium placed on a placement surface M1 of the medium placement unit ST in a transport direction. The transport section CR includes, as one of these rollers, a transport roller RL that picks up the print medium from the medium placement unit ST and transports the print medium in the transport direction. The configuration of the transport section CR may be any configuration as long as the transport section CR includes the transport roller RL and is capable of transporting the print medium placed on the placement surface M1 of the medium placement unit ST in the transport direction. Note that in FIG. 1, the transport roller RL is omitted to simplify the drawing. A dotted line shown in FIG. 2 indicates an example of a transport path along which the print medium is transported by the transport section CR. The printing section PR includes, for example, an ink jet type printing head and performs printing on the print medium transported by the transport section CR. In FIG. 2, the printing section PR is illustrated as a rectangular object in order to prevent the drawing from being complicated. The configuration of the printing section PR may be any configuration as long as printing can be performed on the print medium transported by the transport section CR, even if the printing section PR does not include an ink jet type printing head. The printing section PR prints an image at a predetermined position in the transport path, which is indicated by dotted line in FIG. 2, on the print medium passing through the position.

Figure 3:
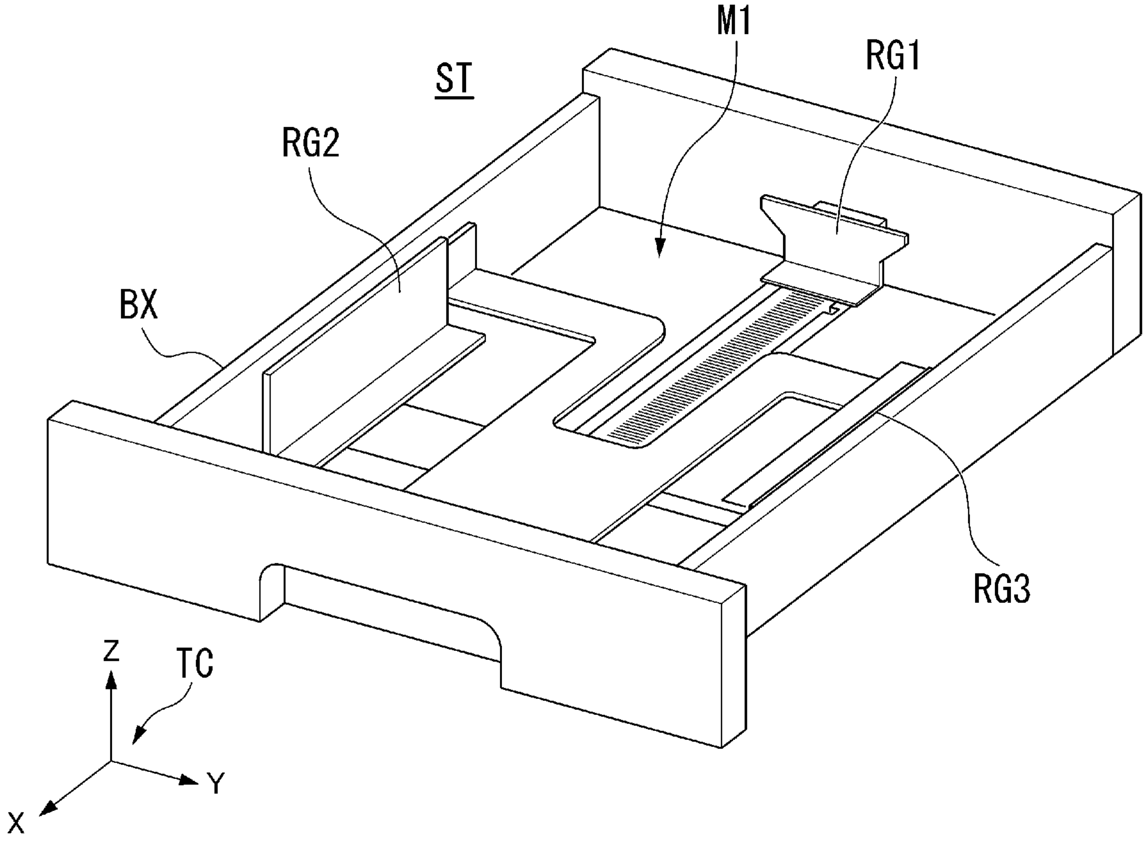
FIG. 3 is a perspective view showing an example of the configuration of a medium placement unit ST.
Figure 4:
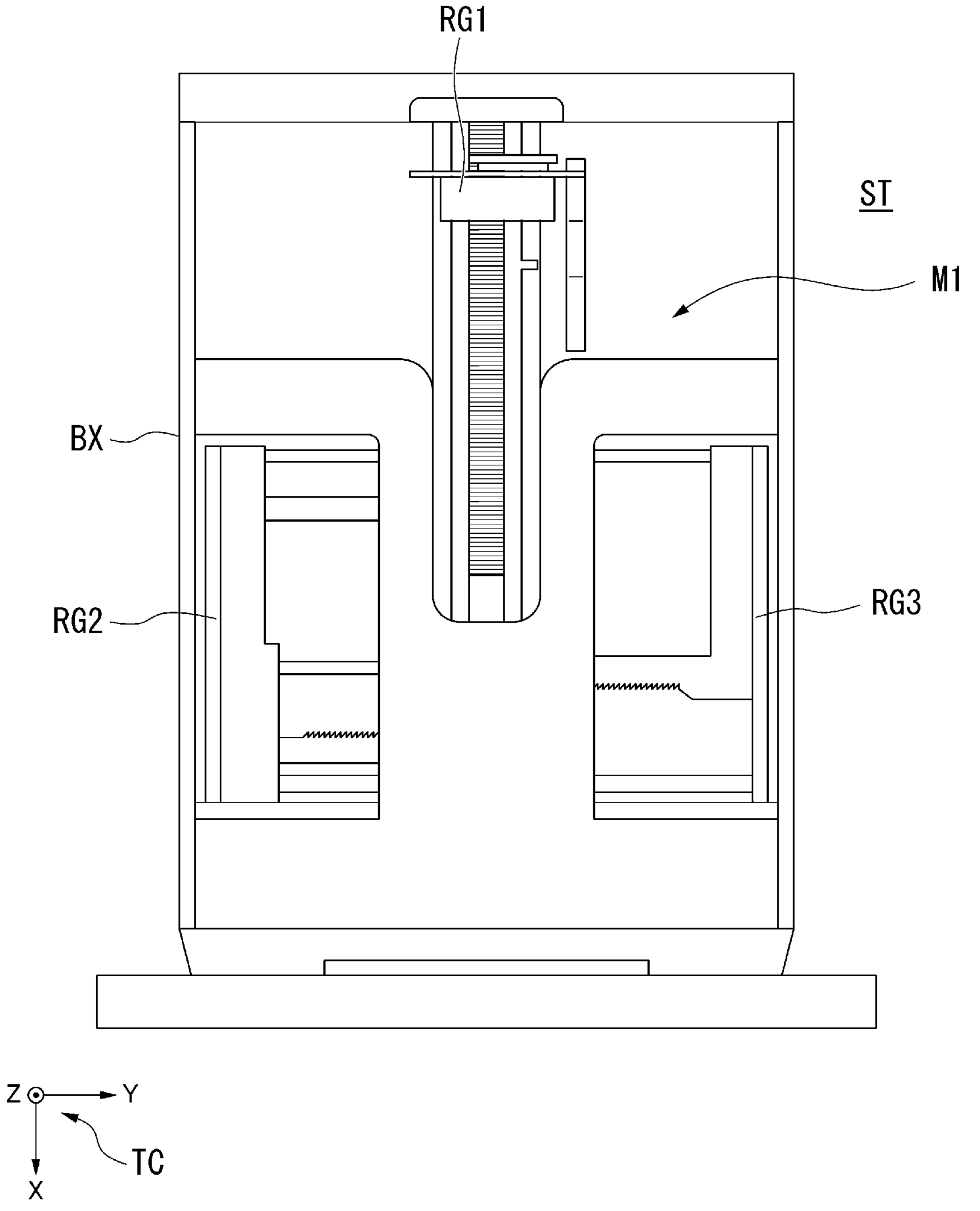
FIG. 4 is a top view of the medium placement unit ST shown in FIG. 3.

FIG. 3 is a perspective view showing an example of the configuration of the medium placement unit ST. FIG. 4 is a top view of the medium placement unit ST shown in FIG. 3.

In the example shown in FIGS. 3 and 4, the medium placement unit ST has a housing BX having a drawer-like shape as a whole, and the print medium can be stored inside the housing BX from the upper side of the medium placement unit ST. In this example, the medium placement unit ST includes the placement surface M1, a first restriction section RG1, a second restriction section RG2, and a third restriction section RG3 inside the housing BX. Note that the medium placement unit ST may not include a portion of the first restriction section RG1 to the third restriction section RG3. The medium placement unit ST may not include the housing BX. In this case, for example, the placement surface M1 and the first restriction section RG1 to the third restriction section RG3 are provided on a plate-shaped member in the medium placement unit ST. In this case, the plate-shaped member and the placement surface M1 may be configured integrally or separately.

The placement surface M1 is a surface on which the print medium is placed.

The first restriction section RG1 is a member that, by being moved over the placement surface M1, restricts movement of the print medium placed on the placement surface M1. In other words, the first restriction section RG1 is a member that, by being slid over the placement surface M1, restricts movement of the print medium placed on the placement surface M1. The first restriction section RG1 is sometimes referred to as an edge guide. The first restriction section RG1 is movable in parallel with a first axis, which is parallel to the placement surface M1. The first axis may be any axis extending in any direction as long as it is a virtual axis and is parallel to the placement surface M1. Hereinafter, as an example, a case will be described where the first axis is an axis parallel to the X-axis as illustrated in FIGS. 3 and 4. In this case, the first restriction section RG1 is relatively movable with respect to the placement surface M1 in both a direction A11, which, of the directions parallel to the X-axis, is the direction approaching the print medium placed on the placement surface M1, and a direction A12, which, of the directions parallel to the X-axis, is the direction opposite to the direction A11. Therefore, the user can bring the first restriction section RG1 closer to the print medium placed on the placement surface M1 by moving the first restriction section RG1 over the placement surface M1 in parallel with the X-axis. That is, the first restriction section RG1 in this example is a member that restricts movement of the print medium over the placement surface M1 in the directions parallel to the X-axis. Note that the direction A11 is an example of a first direction. The direction A12 is an example of a second direction.

The first restriction section RG1 can be engaged with the placement surface M1 by at least one of two members included in the first restriction section RG1. One of these two members is a member that can restrict movement of the first restriction section RG1 over the placement surface M1 by engaging with the placement surface M1. That is, the user brings the first restriction section M1 close to the print medium on the placement surface RG1 and then, by this member, engages the first restriction section RG1 with the placement surface M1. By this, it is possible to suppress the print medium from moving in parallel to the first axis at a predetermined placement position on the placement surface M1. The placement position is a position determined in advance as a position at which the print medium is to be positioned when the print medium is transported by the transport section CR. Note that the placement position varies depending on the size of the print medium. Here, the position of the print medium on the placement surface M1 is represented by, for example, the positions of the four corners of the print medium on the placement surface M1, but instead of this, may be represented by the positions of other parts of the print medium on the placement surface M1. On the other hand, the other of the two members is a member that, by engaging with the placement surface M1, can notify the user that the position of the first restriction section RG1 on the placement surface M1 is within an engagement range, which includes a position corresponding to a print medium of predetermined size. This member can, by a sound or the like generated when the member engages with the placement surface M1, notify the user that the position of the first restriction section RG1 on the placement surface M1 is within the engagement range, which includes the position corresponding to a print medium of predetermined size. These two members will be described in detail later.

The second restriction section RG2 is a member that, by being moved over the placement surface M1, restricts movement of the print medium placed on the placement surface M1. In other words, the second restriction section RG2 is a member that, by being slid over the placement surface M1, restricts movement of the print medium placed on the placement surface M1. The configuration of the second restriction section RG2 is substantially the same as that of the first restriction section RG1. However, the second restriction section RG2 is movable in parallel to a second axis, which is parallel to the placement surface M1. The second axis may also be any axis extending in any direction as long as it is a virtual axis and is parallel to the placement surface M1. Hereinafter, as an example, a case will be described where the second axis is an axis parallel to the Y-axis illustrated in FIGS. 3 and 4. In this case, the second as restriction section RG2 is relatively movable with respect to the placement surface M1 in both a direction A21, which, of the directions parallel to the Y-axis, is the direction approaching the print medium placed on the placement surface M1, and a direction A22, which, of the directions parallel to the Y-axis, is the direction opposite to the direction A21. Therefore, the user can bring the second restriction section RG2 closer to the print medium placed on the placement surface M1 by moving the second restriction section RG2 over the placement surface M1 in parallel to the Y-axis. That is, the second restriction section RG2 in this example is a member that restricts movement of the print medium over the placement surface M1 in the directions parallel to the Y-axis. Note that the direction A21 is an example of a first direction. The direction A22 is an example of a second direction.

The third restriction section RG3 is a member that, by moving over the placement surface M1, restricts movement of the print medium placed on the placement surface M1. In other words, the third restriction section RG3 is a member that, by sliding over the placement surface M1, restricts movement of the print medium placed on the placement surface M1. The configuration of the third restriction section RG3 is substantially the same as that of the first restriction section RG1. However, the third restriction section RG3 is movable in parallel to a third axis, which is parallel to the placement surface M1. The third axis may also be any axis extending in any direction as long as it is a virtual axis and is parallel to the placement surface M1. Hereinafter, as an example, a case will be described where the third axis is an axis parallel to the Y-axis as illustrated in FIGS. 3 and 4. In this case, the third restriction section RG3 is relatively movable with respect to the placement surface M1 in both a direction A31, which, of the directions parallel to the Y-axis, is the direction approaching the print medium placed on the placement surface M1, and a direction A32, which, of the directions parallel to the Y-axis, is the direction opposite to the direction A31. Therefore, the user can bring the third restriction section RG3 closer to the print medium placed on the placement surface M1 by moving the third restriction section RG3 over the placement surface M1 in parallel to the Y-axis. Here, the direction A31 is a direction opposite to the direction A21 described above. The direction A32 is a direction opposite to the direction A22. That is, the third restriction section RG3 can approach the print medium over the placement surface M1 from a direction opposite from that of the second restriction section RG2. Note that the direction A31 is an example of a first direction. The direction A32 is an example of a second direction.

Here, the user can bring both the second restriction section RG2 and the third restriction section RG3 close to the print medium placed on the placement surface M1 by moving both the second restriction section RG2 and the third restriction section RG3 over the placement surface M1 in parallel to the Y-axis. For this reason, the medium placement unit ST may be configured to include a mechanism (not shown) that, when the second restriction section RG2 is moved, the third restriction section RG3 moves by the same movement amount as the movement amount of the second restriction section RG2 in a direction opposite to the direction in which the second restriction section RG2 moved, or the medium placement unit ST may be configured without such a mechanism. Hereinafter, as an example, a case will be described in which the medium placement unit ST includes the mechanism.

Note that some or all of the first restriction section RG1 to the third restriction section RG3 may have different configurations as long as the functions of the medium placement unit ST described in the present disclosure are not impaired. Hereinafter, as described above, as an example, a case will be described in which all of the first restriction section RG1 to the third restriction section RG3 have the same configuration. Therefore, hereinafter, the configuration of the first restriction section RG1 to the third restriction section RG3 will be described by taking the configuration of the first restriction section RG1 as an example.

Configuration of Restriction Section

Figure 5:
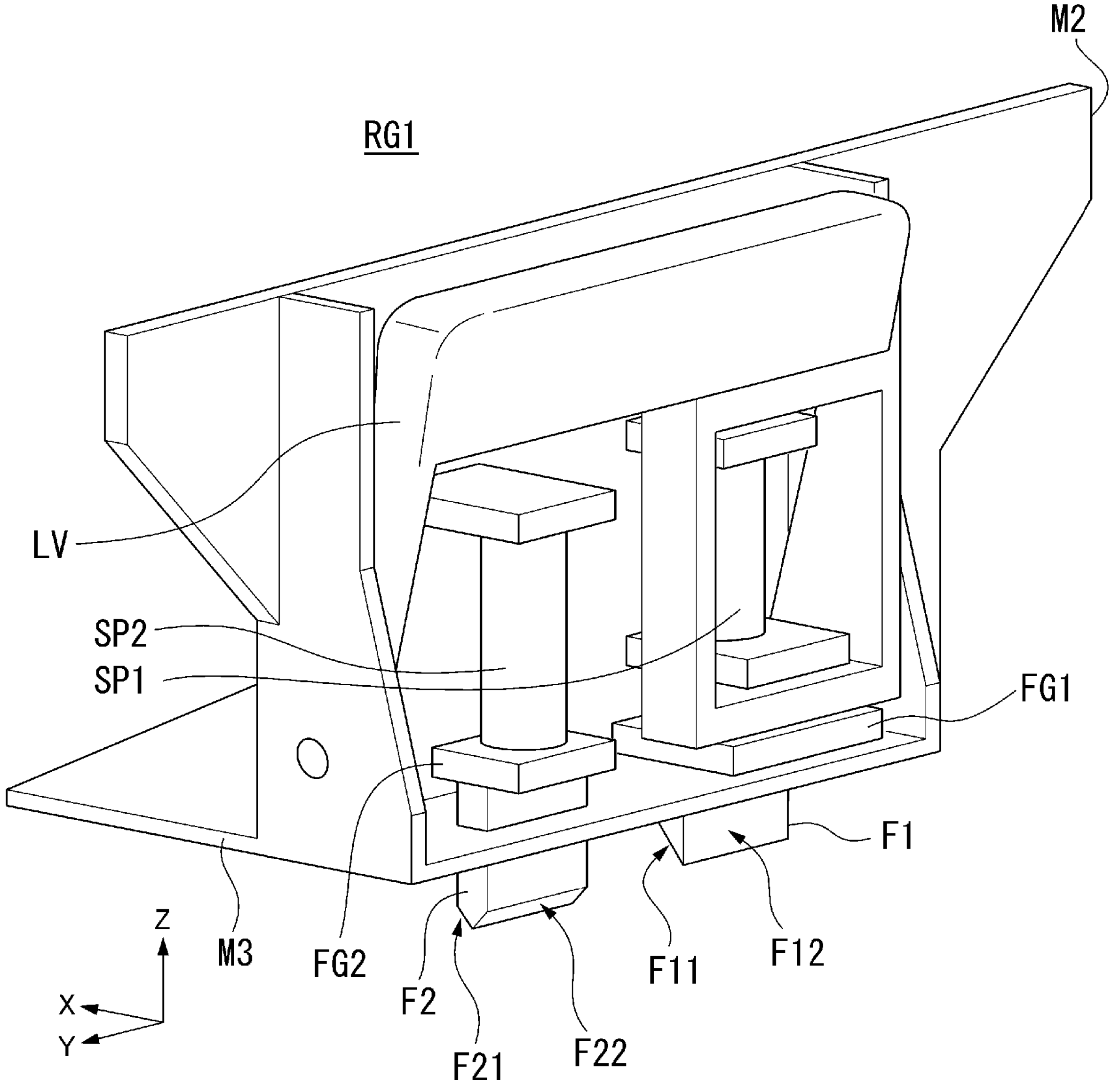
FIG. 5 is a perspective view showing an example of configuration of a first restriction section RG1 shown in FIGS. 3 and 4.
Figure 6:
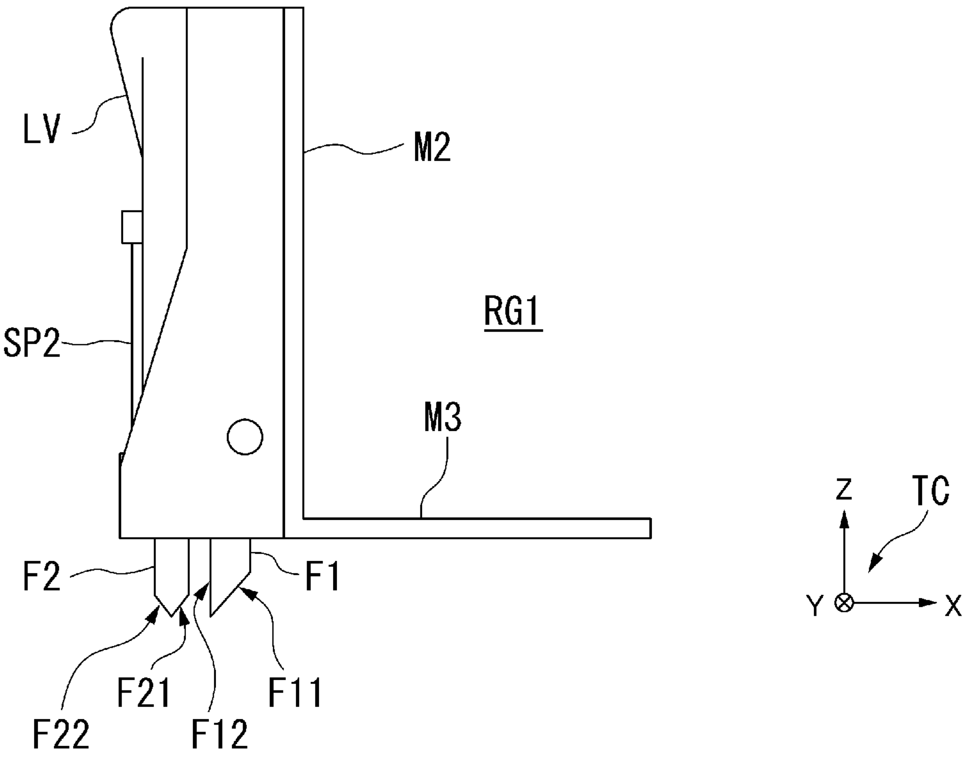
FIG. 6 is a side view of the first restriction section RG1 shown in FIG. 5.

FIG. 5 is a perspective view showing an example of configuration of the first restriction section RG1 shown in FIGS. 3 and 4. FIG. 6 is a side view of the first restriction section RG1 shown in FIG. 5.

The first restriction section RG1 includes a first plate-shaped member M2, a second plate-shaped member M3, a first portion F1, a second portion F2, and an operation section LV.

The first plate-shaped member M2 is a plate-shaped member having a flat surface orthogonal to the first axis. In this example, the first axis is an axis parallel to the X-axis. In this case, the first plate-shaped member M2 is a plate-shaped member having a flat surface orthogonal to the X-axis. The flat surface of the first plate-shaped member M2 faces the positive direction side of the X-axis, that is, the front surface side of the printing device 1. Therefore, the flat surface of the first plate-shaped member M2 faces the print medium placed on the placement surface M1. Note that the flat surface of the first plate-shaped member M2 may be a flat surface having any shape.

The second plate-shaped member M3 is a rectangular flat plate-shaped member parallel to the placement surface M1. The second plate-shaped member M3 is a member that can slide with respect to the placement surface M1. The second plate-shaped member M3 is provided with the first plate-shaped member M2. The first plate-shaped member M2 and the second plate-shaped member M3 may be formed integrally or separately. The second plate-shaped member M3 is formed with an opening through which the first portion F1 (to be described later) is inserted and an opening through which the second portion F2 (to be described later) is inserted.

Of the two portions included in the above-described first restriction section RG1, the first portion F1 is an example of a portion capable of restricting movement of the first restriction section RG1. The first portion F1 is inserted into the opening formed in the second plate-shaped member M3 and protrudes from the lower surface of the second plate-shaped member M3 toward the placement surface M1. The first portion F1 can engage with a portion that can be engaged with the first portion F1 among portions provided on the placement surface M1. When a portion engageable with the first portion F1 among the portions provided on the placement surface M1 is engaged with the first portion F1, movement of the first portion F1 over the placement surface M1 is restricted by the portion. The first portion F1 has a flange FG1 that contacts the upper surface of the second plate-shaped member M3. Therefore, the maximum length by which the first portion F1 can protrude from the lower surface of the second plate-shaped member M3 toward the placement surface M1 is determined in advance. In the example shown in FIGS. 5 and 6, the first portion F1 is a convex-shaped portion that protrudes from the second plate-shaped member M3 toward the placement surface M1. Note that the shape of the first portion F1 may be any shape instead of a convex shape, as long as the shape can engage with the placement surface M1.

In the example shown in FIGS. 5 and 6, among the surfaces of the tip of the convex-shaped first portion F1, a surface F11 on the direction A11 side is a surface that is orthogonal to the XZ plane and that inclines away from the placement surface M1 toward the direction A11. Here, the XZ plane is a virtual plane defined by the X-axis and the Z-axis. On the other hand, in the above example, among the surfaces at the tip of the convex-shaped first portion F1, a surface F12 on the direction A12 side is a surface orthogonal to the XZ plane and is a surface orthogonal to the placement surface M1. That is, in the above example, the shape of the tip of the first portion F1, as viewed in the positive direction of the Y-axis, is a sawtooth wave shape in which one apex is directed toward the placement surface M1. By this, in the medium placement unit ST, movement of the first restriction section RG1 over the placement surface M1 can be restricted by engagement between the first portion F1 and the placement surface M1. However, in the medium placement unit ST, since the tip of the first portion F1 has the surface F11, the first restriction section RG1, whose movement is restricted in a state where the first portion F1 and the placement surface M1 are engaged with each other, can be moved in the direction A11 by the user increasing the force applied to the first restriction section RG1. On the other hand, in the medium placement unit ST, since the tip of the first portion F1 has the surface F12, it is difficult to move the first restriction section RG1 in the direction A12 in a state where the first restriction section RG1 and the placement surface M1 are engaged with each other, even if the user applies a large force to the first restriction section RG1.

In the example shown in FIGS. 5 and 6, the first portion F1 is biased by a first biasing member SP1 in a direction in which the first portion F1 protrudes from the second plate-shaped member M3 toward the placement surface M1. By this, in the medium placement unit ST, the first portion F1 can be more reliably engaged with the placement surface M1. The first biasing member SP1 is, for example, a coil spring. Note that instead of a coil spring, the first biasing member SP1 may be another member capable of biasing the first portion F1 in a direction in which it protrudes from the second plate-shaped member M3 toward the placement surface M1. Note that the first restriction section RG1 may not include the first biasing member SP1. In this case, for example, the user engages the first portion F1 with the placement surface M1 by manually causing the first portion F1 to protrude from the second plate-shaped member M3 toward the placement surface M1. When the first restriction section RG1 is not provided with the first biasing member SP1, the first portion F1 may be configured to protrude from the second plate-shaped member M3 toward the placement surface M1 under its own weight.

The first portion F1 can be raised relative to the second plate-shaped member M3 in response to an operation on the operation section LV by the user. In other words, the amount that the first portion F1 protrudes from the second plate-shaped member M3 can be changed in accordance with such an operation. Therefore, by operating the operation section LV, the user can switch between a state in which the first portion F1 is engaged with the placement surface M1 and a state in which the first portion F1 is not engaged with the placement surface M1.

Of the two portions included in the first restriction section RG1, the second portion F2 is an example of a portion capable of informing the user that the position of the first restriction section RG1 on the placement surface M1 is within the engagement range, which includes the position corresponding to the print medium of predetermined size. The second portion F2 is inserted into an opening formed in the second plate-shaped member M3 and protrudes from the lower surface of the second plate-shaped member M3 toward the placement surface M1. The second portion F2 can be engaged with a portion that, among portions provided on the placement surface M1, can be engaged with the second portion F2. When a portion that, among the portions provided on the placement surface M1, can engage with the second portion F2 engages with the second portion F2, the second portion F2 generates a sound or the like due to collision with the portion and, by this, informs the user that the position of the first restriction section RG1 on the placement surface M1 is within the engagement range, which includes the position corresponding to the print medium of predetermined size. The second portion F2 has a flange FG2 that contacts the upper surface of the second plate-shaped member M3. Therefore, the maximum length by which the second portion F2 can protrude from the lower surface of the second plate-shaped member M3 toward the placement surface M1 is determined in advance. In the example shown in FIGS. 5 and 6, the second portion F2 is a convex-shaped portion that protrudes from the second plate-shaped member M3 toward the placement surface M1. Note that the shape of the second portion F2 may be any shape instead of a convex shape, as long as the shape can engage with the placement surface M1.

In the example shown in FIGS. 5 and 6, among the surfaces of the tip of the convex-shaped second portion F2, a surface F21 on the direction A11 side is a surface that is orthogonal to the XZ plane and that inclines away from the placement surface M1 toward the direction A11. On the other hand, in the above-described example, among the surfaces of the tip of the convex-shaped second portion F2, a surface F22 on the direction A12 side is a surface that is orthogonal to the XZ plane and inclines away from the placement surface M1 toward the direction A12. That is, in the above example, the shape of the tip of the second portion F2, as viewed in the positive direction of the Y-axis, is a triangular wave shape in which one apex is directed toward the placement surface M1. By this, in the medium placement unit ST, in a state in which the second portion F2 and the placement surface M1 are engaged with each other, the first restriction section RG1 can be easily moved in both the direction A11 and the direction A12. The surface F22 is an example of a third inclined surface.

In the example shown in FIGS. 5 and 6, the second portion F2 is biased by the second biasing member SP2 in a direction in which the second portion F2 protrudes from the second plate-shaped member M3 toward the placement surface M1. By this, in the medium placement unit ST, the second portion F2 can be more reliably engaged with the placement surface M1. The second biasing member SP2 is, for example, a coil spring. Note that instead of a coil spring, the second biasing member SP2 may be another member capable of biasing the second portion F2 in a direction in which it protrudes from the second plate-shaped member M3 toward the placement surface M1. Note that the first restriction section RG1 may not include the second biasing member SP2. In this case, for example, the user manually moves the first restriction section RG1 while applying force to the second portion F2 such that the second portion F2 protrudes from the second plate-shaped member M3 toward the placement surface M1. When the first restriction section RG1 does not include the second biasing member SP2, the second portion F2 may be configured to protrude from the second plate-shaped member M3 toward the placement surface M1 under to its own weight.

The operation section LV is a member that raises the first portion F1 with respect to the second plate-shaped member M3 in response to an operation received from the user. In other words, the operation section LV is a member that changes the amount of protrusion of the first portion F1 from the second plate-shaped member M3 in accordance with an operation received from the user. In the example illustrated in FIGS. 5 and 6, the operation section LV is a lever including a mechanism that raises the first portion F1 with respect to the second plate-shaped member M3 and is provided on a direction A12 side surface among the surfaces of the first plate-shaped member M2. For example, when the operation section LV is operated in a direction approaching the first plate-shaped member M2, the first portion F1 is raised with respect to the second plate-shaped member M3. For example, since the first portion F1 is biased from the second plate-shaped member M3 toward the placement surface M1 by the first biasing member SP1, when the operation section LV is released, the operation section LV moves in a direction away from the first plate-shaped member M2 without receiving an operation from the user and lowers the first portion F1 with respect to the second plate-shaped member M3.

Figure 7:
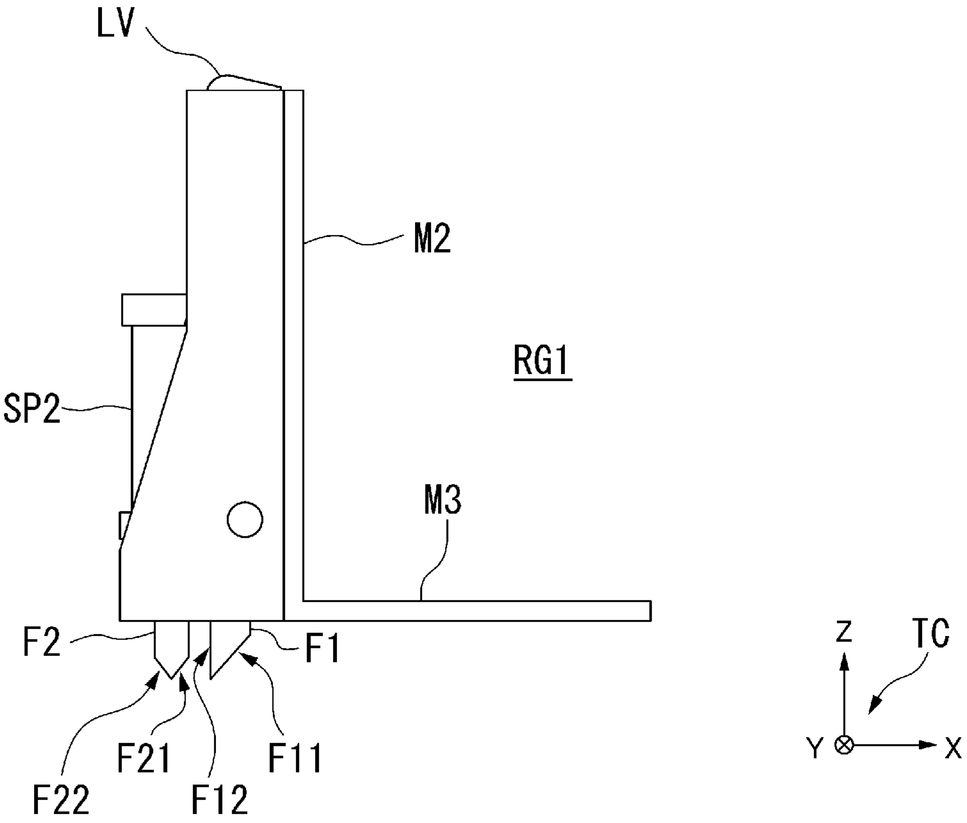
FIG. 7 is a diagram illustrating an example of a state of a first portion F1 when an operation section LV of the first restriction section RG1 illustrated in FIG. 6 is operated in a direction approaching a first plate-shaped member M2.

FIG. 7 is a diagram illustrating an example of a state of a first portion F1 when the operation section LV of the first restriction section RG1 illustrated in FIG. 6 is operated in a direction approaching the first plate-shaped member M2. By comparing FIGS. 6 and 7, it can be seen that the first portion F1 is raised with respect to the second plate-shaped member M3 when the operation section LV is operated toward the direction.

Here, in the example shown in FIGS. 5 to 7, the first portion F1 is positioned further in the direction A11 than the second portion F2. By this, in the medium placement unit ST, it is possible to suppress an increase in the size of the first restriction section RG1 by the amount of the operation section LV in the negative direction of the X-axis. Note that the first portion F1 may be located further on the direction A12 side than the second portion F2, and may be located at a position overlapping the second portion F2 as the first restriction section RG1 is viewed toward the positive direction of the Y-axis.

As described above, the first restriction section RG1 having the above-described configuration is engaged with the placement surface M1 separately by the two portions of the first portion F1 and the second portion F2. Hereinafter, configuration will be described for the placement surface M1 provided with a portion engageable separately with the first portion F1 and the second portion F2.

Configuration of Placement Surface

Figure 8:
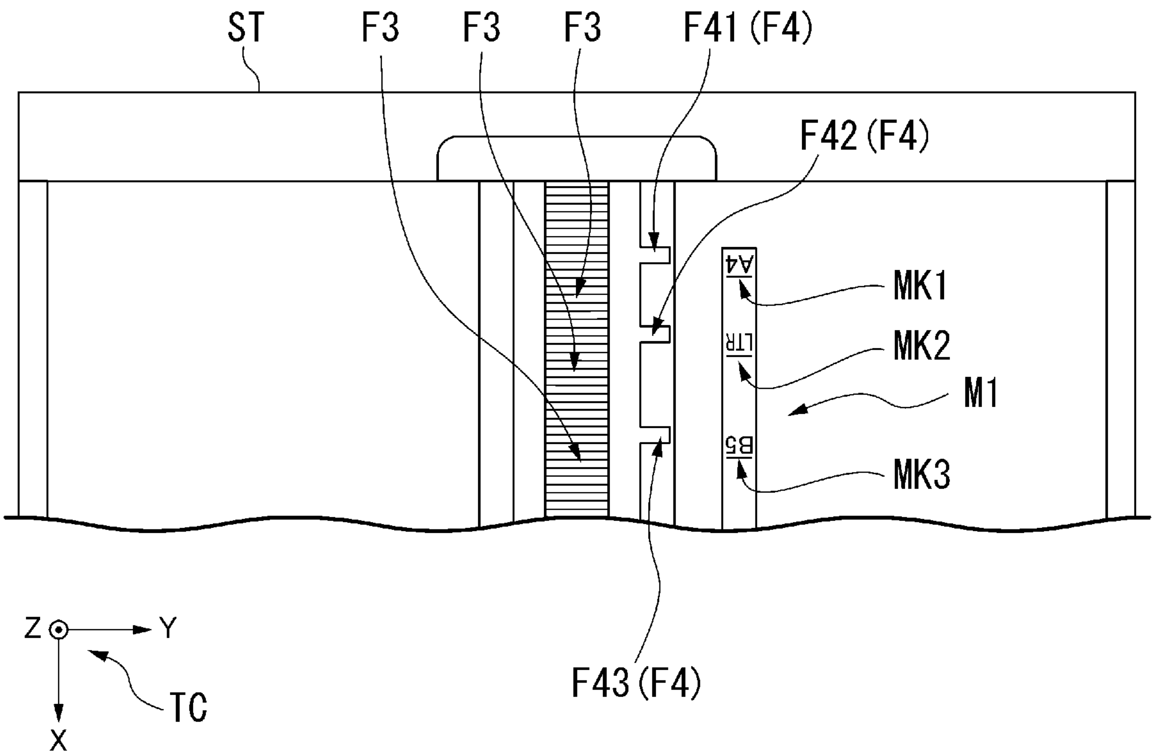
FIG. 8 is an enlarged view of a part of a placement surface M1 shown in FIG. 4.

FIG. 8 is an enlarged view of a part of the placement surface M1 shown in FIG. 4. A plurality of third portions F3 and one or more fourth portion F4 are provided on the placement surface M1. Hereinafter, a case as shown in FIG. 8 will be described in which three fourth portions F4 are provided on the placement surface M1. Hereinafter, for convenience of description, the three fourth portions F4 will be referred to as a fourth portion F41, a fourth portion F42, and a fourth portion F43 in order from the rear surface side to the front surface side of the printing device 1.

Figure 9:
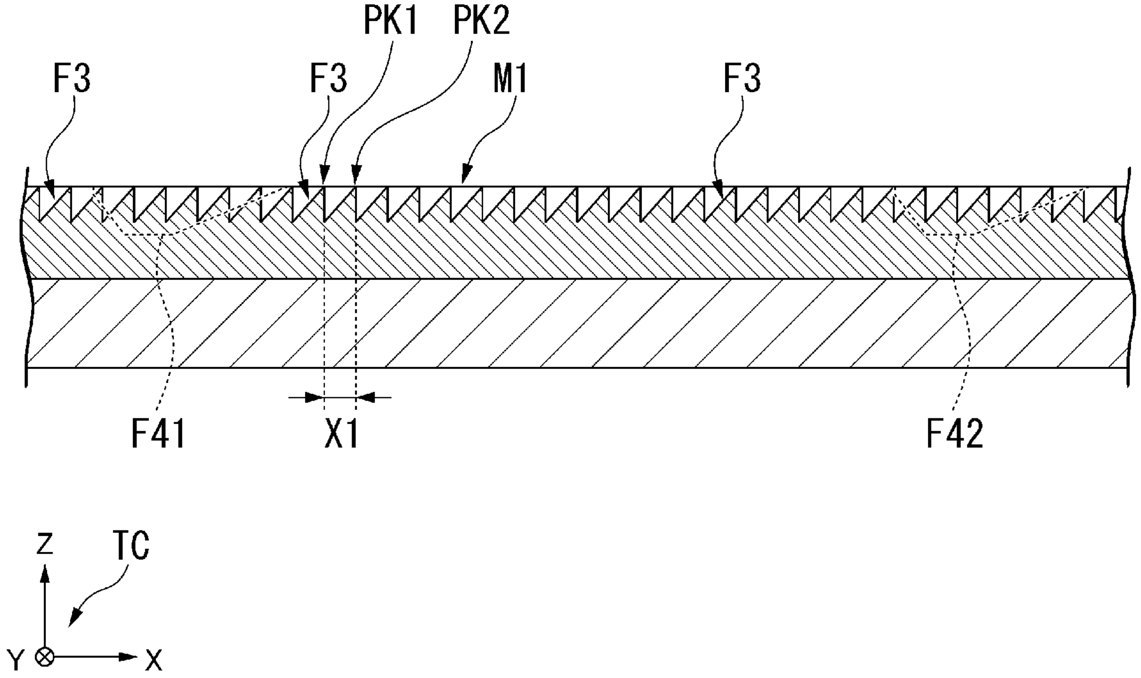
FIG. 9 is a side view of a plurality of third portions F3 arranged in the direction A11.

Each of the plurality of third portions F3 is an example of a portion that can engage with the first portion F1. For example, when the first portion F1 is a convex-shaped portion, each of the plurality of third portions F3 is a concave-shaped portion into which fits the first portion F1. To be more specific, when the tip of the first portion F1 has a sawtooth wave shape as illustrated in FIGS. 5 to 7, then each of the plurality of third portions F3 is a portion having a sawtooth wave shape into which fits the first portion F1. Therefore, when each of the plurality of third portions F3 engages with the first portion F1, then movement of the first restriction section RG1 is restricted in the direction A11 and the direction A12. In order to prevent the drawing from becoming complicated, three third portions F3 of the plurality of third portions F3 are indicated in FIG. 8 as representative examples of the plurality of third portions F3. The plurality of third portions F3 are provided on the placement surface M1 so as to be arranged in parallel to the direction A11. That is, in this example, the plurality of third portions F3 are portions formed on the surface in the manner of a rack of a rack and pinion, with sawtooth wave shaped teeth for engaging with the first portions F1. FIG. 9 is a side view of a plurality of third portions F3 arranged in the direction A11. As illustrated in FIG. 9, when any one of the plurality of third portions F3 arranged in the direction A11 engages with the first portion F1, movement of the first restriction section RG1 is restricted in the direction A11 and the direction A12. However, when the user operates the operation section LV in a direction approaching the first plate-shaped member M2, the first portion F1 rises with respect to the second plate-shaped member M3, so it becomes possible to release engagement between the first portion F1 and the third portion F3. When engagement between the first portion F1 and the third portion F3 is released, the user can move the first restriction section RG1 over the placement surface M1 in both the direction A11 and the direction A12.

The plurality of third portions F3 are consecutively arranged in parallel to the direction A11. The distances between adjacent third portions F3 of the plurality of third portions F3 are expressed as, for example, the distances between adjacent apexes amongst all apexes of the teeth of the sawtooth waves of the plurality of third portions F3 arranged in the direction A11. The apex PK1 shown in FIG. 9 is an example of the apex of such a sawtooth wave. The apex PK2 shown in FIG. 9 is an example of an apex of a sawtooth wave adjacent to the sawtooth wave having the apex PK1. The distance X1 in the direction A11 between the apex PK1 and the apex PK2 is an example of the distance between adjacent third portions F3 of the plurality of third portions F3. Hereinafter, for convenience of description, the distance between adjacent third portions F3 of the plurality of third portions F3 will be referred to as pitch. The pitch can be described as the distance between adjacent positions among the plurality of positions on the placement surface M1 where the first portion F1 can engage with the placement surface M1. That is, the medium placement unit ST, movement of the first restriction section RG1 can be restricted every time the first restriction section RG1 is moved over the placement surface M1 by one pitch in parallel to the first axis. Therefore, the shorter the pitch is, the shorter the distance between positions where movement of the first restriction section RG1 can be restricted. In other words, the shorter the pitch, the more finely the position of the first restriction section RG1 can be adjusted, and the longer the pitch, the less finely the position of the first restriction section RG1 can be adjusted. In a medium placement unit different from the medium placement unit ST, the pitch is long with respect to the accuracy required for adjustment of the position of the first restriction section RG1. As a result, skew and paper feeding failure may occur when the print medium are transported. The medium placement unit different from the medium placement unit ST is, for example, a conventional medium placement unit or the like.

Therefore, in the medium placement unit ST, the plurality of third portions F3 are provided on the placement surface M1 such that the pitch is equal to or less than the cutting tolerance of the print medium. For this reason, the first restriction section RG1 of the medium placement unit ST can restrict movement each time the first restriction section RG1 is moved over the placement surface M1 in parallel to the first axis by a distance equal to or lower than a cutting tolerance of the print medium. Here, for example, according to the Japanese Industrial Standards (JIS), the cutting tolerance of print medium are determined to be ±1.5 mm for cutting lengths (dimensions) equal to or less than 150 mm, ±2 mm for cutting lengths greater than 150 mm and equal to or less than 600 mm, and ±3 mm for cutting lengths greater than 600 mm. However, for example, the general cutting tolerance of print medium in Japan is about ±1 mm. In this way, the cutting tolerance of the print medium varies depending on countries, regions, customs, and the like. For this reason, the value adopted as the cutting tolerance of the print medium used for determining the pitch may be determined by the standard of each country, the standard of each region, custom, or the like, or may be determined by a unique standard. However, from the viewpoint of enhancing versatility of the medium placement unit ST, it is desirable that the value be as small as possible. Hereinafter, as an example, a case will be described in which the cutting tolerance of the print medium is ±1 mm. Hereinafter, as an example, a case will be described in which the pitch is 0.5 mm.

The fourth portion F4 is an example of a portion engageable with the second portion F2. The fourth portion F4 is a portion provided at a position corresponding to a print medium of predetermined size, among positions on the placement surface M1. In the example shown in FIG. 8, the fourth portion F41 is provided at a position corresponding to A4 size print medium. In the above-described example, the fourth portion F42 is provided at a position corresponding to a letter-size print medium. In the above example, the fourth portion F43 is provided at a position corresponding to the print medium of B5 size. When the medium placement unit ST is provided with a plurality of fourth portions F4, the plurality of fourth portions F4 are intermittently arranged toward the direction A11 as illustrated in FIG. 8. In order to clearly show the relative positions in FIG. 9 of the plurality of third portions F3 and, of the three fourth portions F4, the fourth portion F41 and the fourth portion F42, the outlines of the fourth portion F41 and of the fourth portion F42, which are located behind the plurality of third portions F3, are shown in dotted line.

Figure 10:
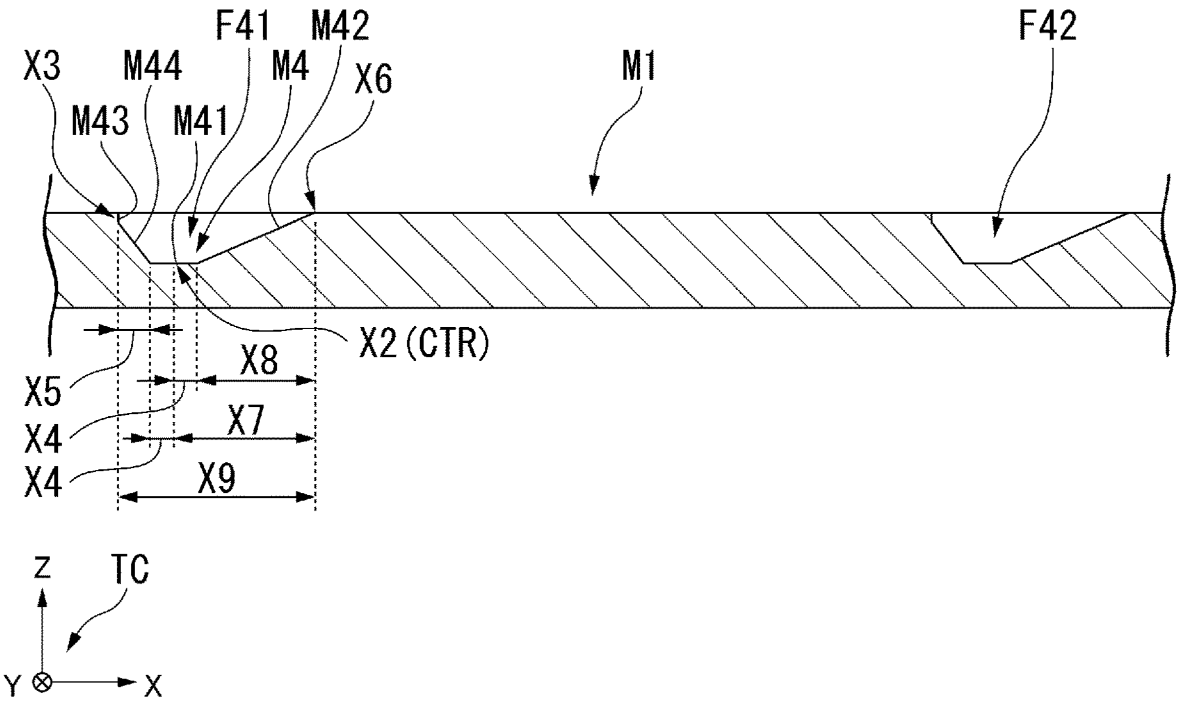
FIG. 10 is a side view of a fourth portion F41 and a fourth portion F42 shown in FIG. 9.

FIG. 10 is a side view of the fourth portion F41 and the fourth portion F42 shown in FIG. 9. The fourth portion F41 to the fourth portion F43 have the same configuration. Therefore, as shown in FIG. 10, the fourth portion F41 to the fourth portion F43 have the same shape as viewed in the positive direction of the Y-axis. Therefore, hereinafter, configuration of the fourth portion F41 to the fourth portion F43 will be described using the configuration of the fourth portion F41 as an example. Note that the fourth portion F41 to the fourth portion F43 may have configurations different from each other as long as the functions of the medium placement unit ST described in the present disclosure are not impaired.

The fourth portion F41 is a concave-shaped portion that extends parallel to the direction A11 and into which the second portion F2 can be inserted. The length of the fourth portion F41 is longer in the direction A11 than the length of the second portion F2 in the direction A11. Therefore, when the placement surface M1 is viewed from the direction orthogonal to the placement surface M1, the position corresponding to an A4 size print medium is within the fourth portion F41. Hereinafter, for convenience of description, the position corresponding to A4 size print medium will be referred to as a A4 size position X2. Here, the position X2 is a position at which the tip of the second portion F2 is located when the placement surface M1 is viewed from a direction orthogonal to the placement surface M1 and when the first plate-shaped member M2 contacts the end section on the direction A12 side of the A4 size print medium placed at the placement position of the A4 size print medium. A position X3 is the position of, among end sections of the fourth portion F41, the end section on the direction A12 side as the placement surface M1 is viewed toward the positive direction of the Y-axis. In addition, the position X3 is also the position where the end section of the second portion F2 on the direction A12 side is located when the tip of the second portion F2 is located at a position deviated from the A4 size position X2 toward the direction A12 side by an absolute value X4 or more of the cutting tolerance of A4 size print medium. Hereinafter, as an example, a case will be described in which the position X3 is the position where the direction A12 side end section of the second portion F2 is located at the time that the end section of the second portion F2 is located at a position shifted from the position X2 toward the direction A12 side by the absolute value X4. In the example shown in FIG. 10, the center CTR in the direction A11 of a flat surface M41 (to be described later) coincides with the A4 size position X2. Therefore, the length between the position X3 and the position X2 in the direction A11 is the length of the absolute value X4 added to a length X5, which is half the length of the second portion F2 in the direction A11 when viewing the placement surface M1 toward the positive direction of the Y-axis. A position X6 is the position of, among end sections of the fourth portion F41, the end section on the direction A11 side when the placement surface M1 is viewed toward the positive direction of the Y-axis. The position X6 is also a position at which a part of the second portion F2 is located when the tip of the second portion F2 is located at a position shifted from the position X2 toward the direction A11 side by the absolute value X4 or more. In FIG. 10, as an example, the position X6 is a position where the tip of the second portion F2 is located at the time that the tip of the second portion F2 is located at a position shifted from the position X2 toward the direction A11 by a predetermined length X7, which is larger than the absolute value X4. That is, the predetermined length X7 is a length obtained by adding a predetermined length X8 to the absolute value X4. The length X8 may be any distance, and in the example shown in FIG. 10, the length X8 is about six times the absolute value X4, but is not limited thereto. Note that the position X6 may be a position where the tip of the second portion F2 is located when the tip of the second portion F2 is located at a position shifted from the position X2 toward the direction A11 by the absolute value X4. That is, the predetermined length X7 may be equal to the absolute value X4. With such a configuration, even when the second portion F2 is engaged with the fourth portion F41 provided at the position X2, movement is not restricted in the direction A11 and the direction A12. That is, in the state when the first portion F1 is not engaged with the third portion F3, the user can move the first restriction section RG1 in both the direction A11 and the direction A12 while the second portion F2 remains engaged with the fourth portion F41. The length X9 of the fourth portion F41, as the placement surface M1 is viewed in the positive direction of the Y-axis, is an example of the engagement range including the position corresponding to the print medium of the predetermined size.

As described above, the fourth portion F41 generates a sound when the second portion F2 engages with the fourth portion F41. This is because, since the second portion F2 is biased toward the placement surface M1, when the second portion F2 engages with the fourth portion F41, the second portion F2 descends at a great speed from the placement surface M1 toward the bottom of the fourth portion F41, and strikes the bottom of the fourth portion F41. In order to efficiently perform this, the fourth portion F41 has a contact surface M4 that contacts the second portion F2 in a state where the fourth portion F41 is engaged with the second portion F2. The contact surface M4 includes the flat surface M41, which is parallel to the placement surface M1. The flat surface M41 is a surface that constitutes the bottom of the fourth portion F41, and is a surface that creates play in movement of the first restriction section RG1 when the second portion F2 is engaged with the fourth portion F41. In the example shown in FIG. 10, the flat surface M41 is provided such that the center CTR of the flat surface M41 in the direction A11 coincides with the A4 size position X2. In this case, when the first restriction section RG1 is positioned at a position where movement of the A4 size print medium placed at the A4 size print medium placement position is restricted, the tip of the second portion F2 contacts the center CTR. Since in the medium placement unit ST, the center CTR coincides with the position X2 as described above, the position of the first restriction section RG1 can be finely adjusted while the second portion F2 remains engaged with the fourth portion F41, even when the size of the print medium deviates from the A4 size in either direction due to cutting tolerance. As a result, in the medium placement unit ST, movement of the print medium can be accurately restricted by the first restriction section RG1. In other words, the medium placement unit ST can tolerate both large and small deviations of the print medium size from the A4 size due to cutting tolerance. On the other hand, in this case, when the first restriction section RG1 is located at a position where the first restriction section RG1 restricts a print medium that is placed at the placement position and that is larger than the A4 size print medium due to the cutting tolerance, the tip of the second portion F2 contacts a position in the direction A12 from the center CTR, among the positions on the contact surface M4. By this, in the medium placement unit ST, even when the size of the print medium is larger than the A4 size due to cutting tolerance, the user can finely adjust the position of the first restriction section RG1 after the user is notified by sound or the like that the fourth portion F41 and the second portion F2 are engaged with each other. That is, in the medium placement unit ST, the user can be urged to finely adjust the position of the first restriction section RG1 by the sound or the like. Note that a user who recognizes the A4 size position tends not to perform such fine adjustment because the user is not accustomed to doing so. For this reason, it is important to prompt the user, by sound or the like, to perform such fine adjustment in order to suppress the occurrence of skew and paper feeding failure when the print medium is transported.

In the example shown in FIG. 10, the contact surface M4 includes a first inclined surface M42, which connects the flat surface M41 and the placement surface M1 toward the direction A11, a vertical surface M43, which extends vertically from the placement surface M1 toward the contact surface M4, and a second inclined surface M44, which connects the flat surface M41 and the vertical surface M43 toward the direction A12. Note that the contact surface M4 may be configured without some or all of the first inclined surface M42, the vertical surface M43, and the second inclined surface M44. For example, when the contact surface M4 does not include the first inclined surface M42, the end section of the flat surface M41 on the direction A11 side, among the end sections of the flat surface M41, is connected to the placement surface M1 by a surface that is connected to the placement surface M1 in a direction that is orthogonal to the placement surface M1. For example, when the contact surface M4 does not include the vertical surface M43, an end section of the flat surface M41 on the direction A12 side is connected to the placement surface M1 by the second inclined surface M44. For example, when the contact surface M4 does not include the second inclined surface M44, the end section of the flat surface M41 on the direction A12 side, among the end sections of the flat surface M41, is connected to the placement surface M1 by the vertical surface M43. The contact surface M4 may include the first inclined surface M42, the vertical surface M43, and the second inclined surface M44, and may not include the flat surface M41. In this case, the end section of the first inclined surface M42 on the direction A12 side, among the end sections of the first inclined surface M42, is connected to the end section of the second inclined surface M44 on the direction A11 side, among the end sections of the second inclined surface M44. When the contact surface M4 includes the first inclined surface M42, the vertical surface M43, and the second inclined surface M44, and does not include the flat surface M41, the contact surface M4 may further not include the vertical surface M43.

In the fourth portion F41, when the contact surface M4 includes the vertical surface M43 as shown in FIG. 10, the second portion F2 can be easily lowered from the placement surface M1 toward the bottom of the fourth portion F41. In other words, this means that it is possible to easily generate a sound when the second portion F2 engages with the fourth portion F41. When the fourth portion F41 includes the first inclined surface M42, the user can release engagement between the second portion F2 and the fourth portion F41 by moving the first restriction section RG1 toward the direction A11, without separating the first restriction section RG1 upward from the placement surface M1. In this case, when the fourth portion F41 is engaged with the second portion F2, the fourth portion F41 causes the power required to move the first restriction section RG1 to change and the user can be informed that the current position of the first restriction section RG1 is within the engagement range that includes the A4 size position. When the fourth portion F41 includes the second inclined surface M44, the user can, without separating the first restriction section RG1 upward from the placement surface M1, release engagement between the second portion F2 and the fourth portion F41 by moving the first restriction section RG1 toward the direction A12. In this case, when the fourth portion F41 is engaged with the second portion F2, the fourth portion F41 causes the power required to move the first restriction section RG1 to change and the user can be informed that the current position of the first restriction section RG1 is within the engagement range that includes the A4 size position.

According to such a configuration, the fourth portion F41 can, by both sound and the change in force required to move the first restriction section RG1, notify the user that the current position of the first restriction section RG1 is within the engagement range including the A4 size position. Since the fourth portion F41 does not restrict movement of the second portion F2, the first restriction section RG1 can move within the engagement range including the A4 size position in both the direction A11 and the direction A12 while maintaining the state of being engaged with the second portion F2. This means that even when the size of the print medium placed on the placement surface M1 is different from a predetermined size due to cutting tolerance, movement of the print medium can be accurately restricted by the first restriction section RG1.

Here, when the placement surface M1 is viewed from the direction orthogonal to the placement surface M1, two or more third portions F3 of the plurality of third portions F3 are included in the range in which the first portion F1 can move while maintaining the state where the second portion F2 is engaged with the fourth portion F41. This is because, as described above, the pitch is a distance equal to or less than the cutting tolerance of the print medium. By this, in the above-described case, the user can restrict movement of the first restriction section RG1 in the direction A11 and the direction A12 at a plurality of positions while maintaining the state where the second portion F2 is engaged with the fourth portion F41. In other words, in the state in which the second portion F2 is engaged with the fourth portion F41, when a certain third portion F31 of the plurality of third portions F3 is engaged with the first portion F1, the first restriction section RG1 can change the third portion F3 engaged with the first portion F1 to the third portion F32, which is positioned adjacent to the third portion F31, while maintaining the state in which the second portion F2 is engaged with the fourth portion F41. Therefore, even if the size of the print medium placed on the placement surface M1 differs from the A4 size due to cutting tolerance, the user can move the first restriction section RG1 to an appropriate position according to the size of the print medium, and can restrict movement of the first restriction section RG1 at that position. As a result, in the medium placement unit ST, it is possible to suppress the occurrence of skew, sheet feeding failure, and the like in the transport of the A4 size print medium among the print medium placed on the placement surface M1. Note that in the medium placement unit ST, it is preferable that two or more third portions F3 are included, when the placement surface M1 is viewed from a direction orthogonal to the placement surface M1, in a range in which the first portion F1 can move while a state in which the second portion F2 contacts the flat surface M41 is maintained. In the example shown in FIG. 9, two or more third portions F3 are included in the range. This is because it increases the number of positions at which movement of the first restriction section RG1 can be restricted while the state in which the second portion F2 contacts the flat surface M41 is maintained, and the position at which movement of the first restriction section RG1 is restricted can be more finely adjusted.

Figure 11:
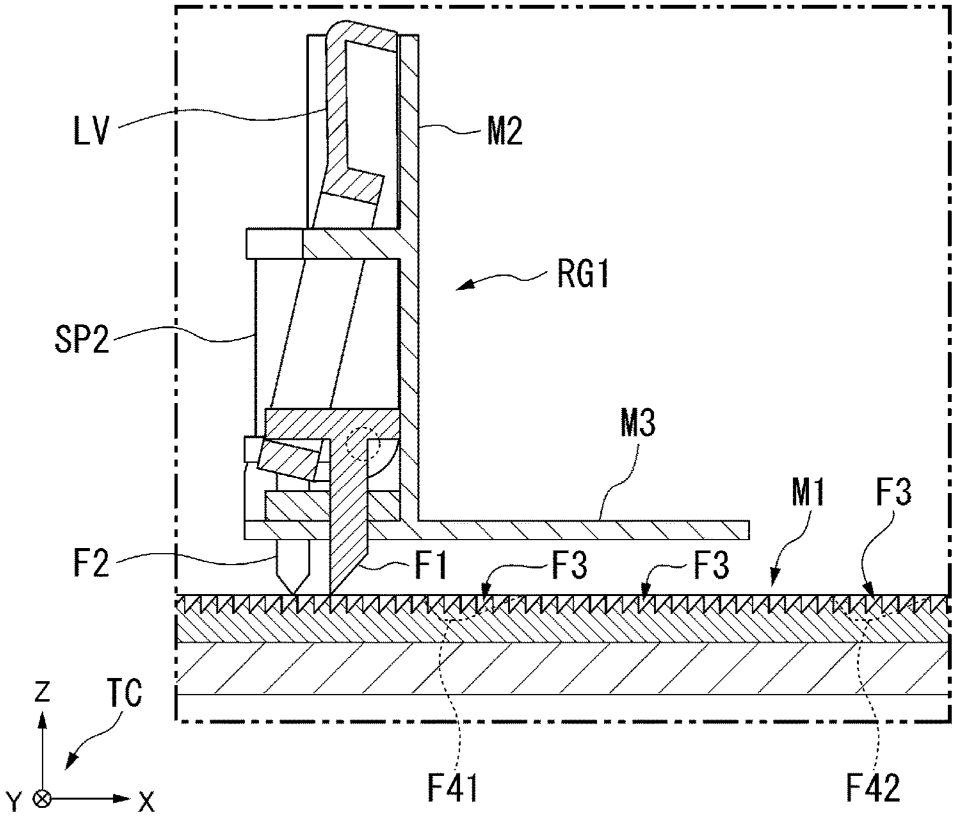
FIG. 11 is a side view illustrating an example of a state of the first restriction section RG1 on the placement surface M1 in a state where the first portion F1 is not engaged with the third portion F3 and in a state where the second portion F2 is not engaged with the fourth portion F41.
Figure 12:
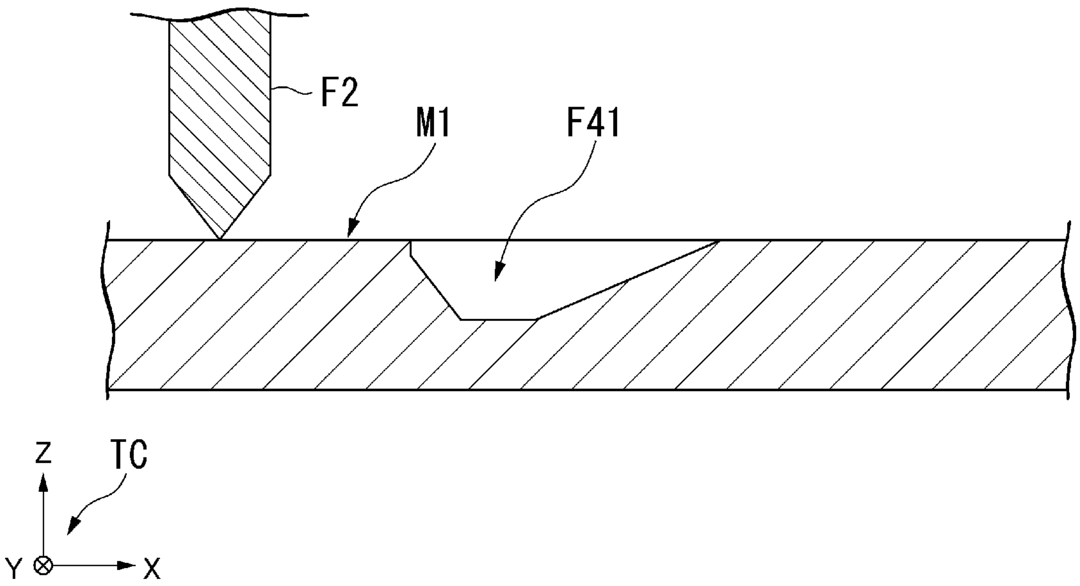
FIG. 12 is an enlarged side view of the periphery of the second portion F2 and the fourth portion F41 shown in FIG. 11.

Movement of the Second Portion when the Second Portion Engages with the Fourth Portion Hereinafter, movement of the second portion F2 when the second portion F2 is engaged with the fourth portion F4 will be described. FIG. 11 is a side view illustrating an example of a state of the first restriction section RG1 on the placement surface M1 in a state where the first portion F1 is not engaged with the third portion F3 and in a state where the second portion F2 is not engaged with the fourth portion F41. FIG. 12 is an enlarged side view of the periphery of the second portion F2 and the fourth portion F41 shown in FIG. 11. However, in FIG. 11, in order to clearly show movement of the second portion F2, the placement surface M1 and the second plate-shaped member M3 are illustrated as being separated from each other. The position of the first restriction section RG1 shown in FIG. 11 is a position further in the direction A12 than the fourth portion F41.

In the example shown in FIGS. 11 and 12, the operation section LV is operated so as to approach the first plate-shaped member M2, so the height of the tip of the first portion F1 rises with respect to the second plate-shaped member M3 to the height of the placement surface M1. Therefore, the first portion F1 is not engaged with any of the plurality of third portions F3. In this case, the user can move the first restriction section RG1 in both the direction A11 and the direction A12. In the example described above, the second portion F2 is positioned at the position where the fourth portion F4 is not present, among the positions on the placement surface M1. Therefore, the tip of the second portion F2 contacts the placement surface M1 due to contraction of the second biasing member SP2.

Figure 13:
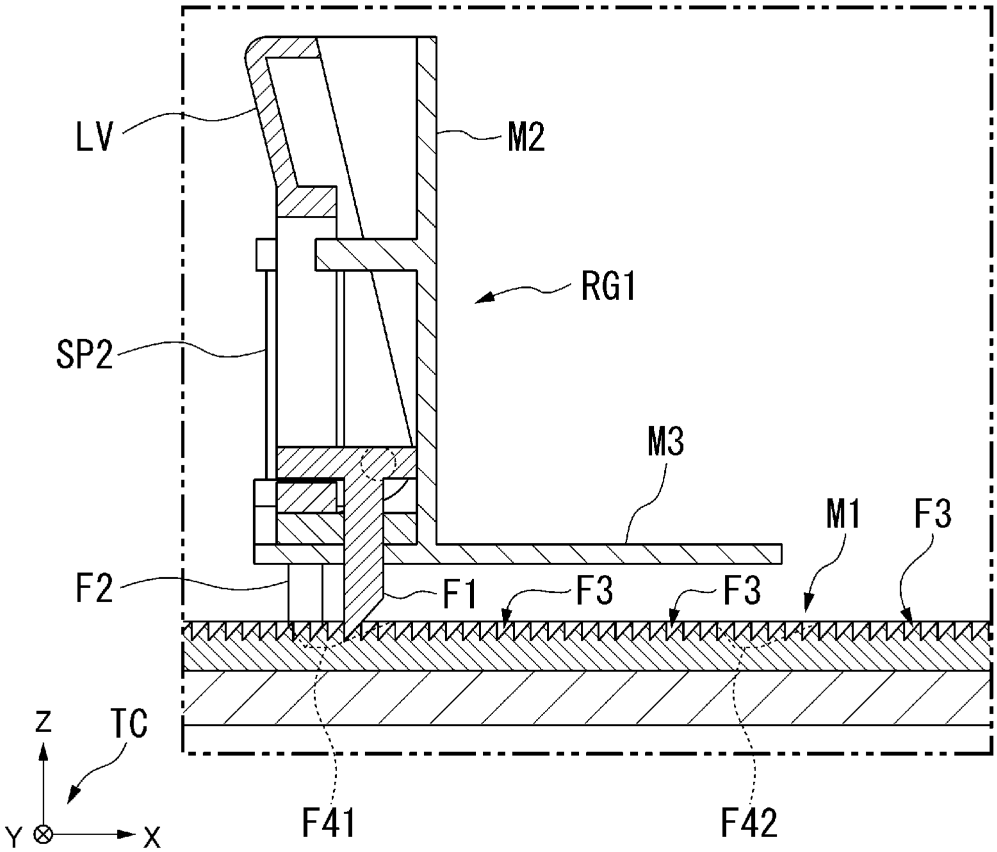
FIG. 13 is a side view illustrating an example of a state of the first restriction section RG1 immediately after the first restriction section RG1 illustrated in FIG. 11 is moved until the second portion F2 engages with the fourth portion F41.
Figure 14:
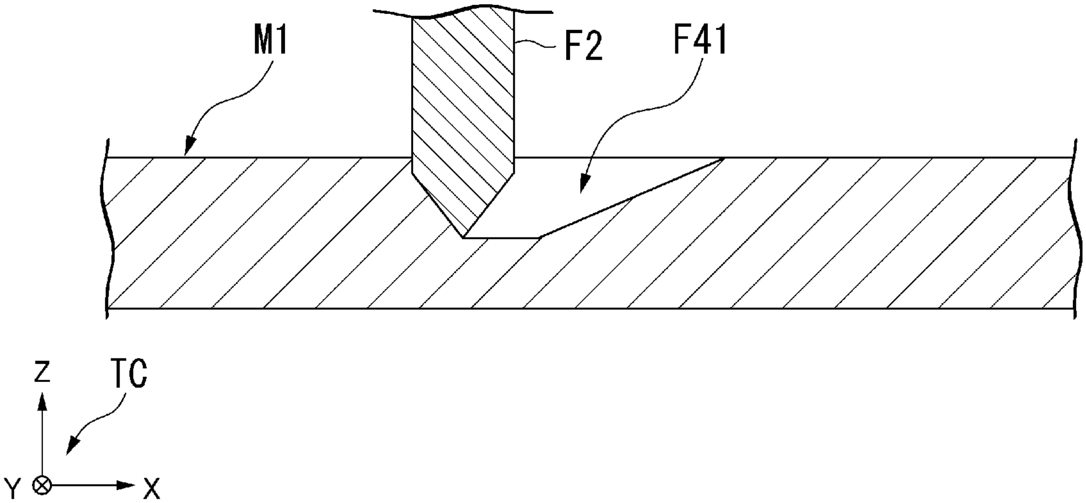
FIG. 14 is an enlarged side view of the periphery of the second portion F2 and the fourth portion F41 shown in FIG. 13.

On the other hand, FIG. 13 is a side view showing an example of a state of the first restriction section RG1 immediately after the first restriction section RG1 shown in FIG. 11 is moved until the second portion F2 engages with the fourth portion F41. FIG. 14 is an enlarged side view of the periphery of the second portion F2 and the fourth portion F41 shown in FIG. 13. However, also in FIG. 13, in order to clearly show movement of the second portion F2, the placement surface M1 and the second plate-shaped member M3 are illustrated as being separated from each other.

As the placement surface M1 is viewed from the direction orthogonal to the placement surface M1 as shown in FIGS. 13 and 14, the second portion F2 starts to descend toward the bottom of the fourth portion F41 by the resilient force of the second biasing member SP2 at the stage where the tip of the second portion F2 enters the contour of the fourth portion F41. This is because the tip of the second portion F2 has the surface F21 and the surface F22 described above and is pointed. Then, when the second portion F2 contacts the bottom of the fourth portion F41, a collision sound between the second portion F2 and the fourth portion F41 is generated as a sound indicating that the second portion F2 and the fourth portion F41 are engaged with each other. At this time, the user's hand holding the first restriction section RG1 senses vibration generated by the contact. By this, the user can know that the second portion F2 is engaged with the fourth portion F41 without visually checking the engagement. In the example shown in FIG. 13, the user has released his/her hand from the operation section LV. Therefore, the operation section LV has moved in a direction separating from the first plate-shaped member M2 of the first restriction section RG1 by the resilient force of the first biasing member SP1, and the first portion F1 is lowered and engaged with the third portion F3. As a result, in the above example, movement of the first restriction section RG1 is restricted in both the direction A11 and the direction A12.

Figure 15:
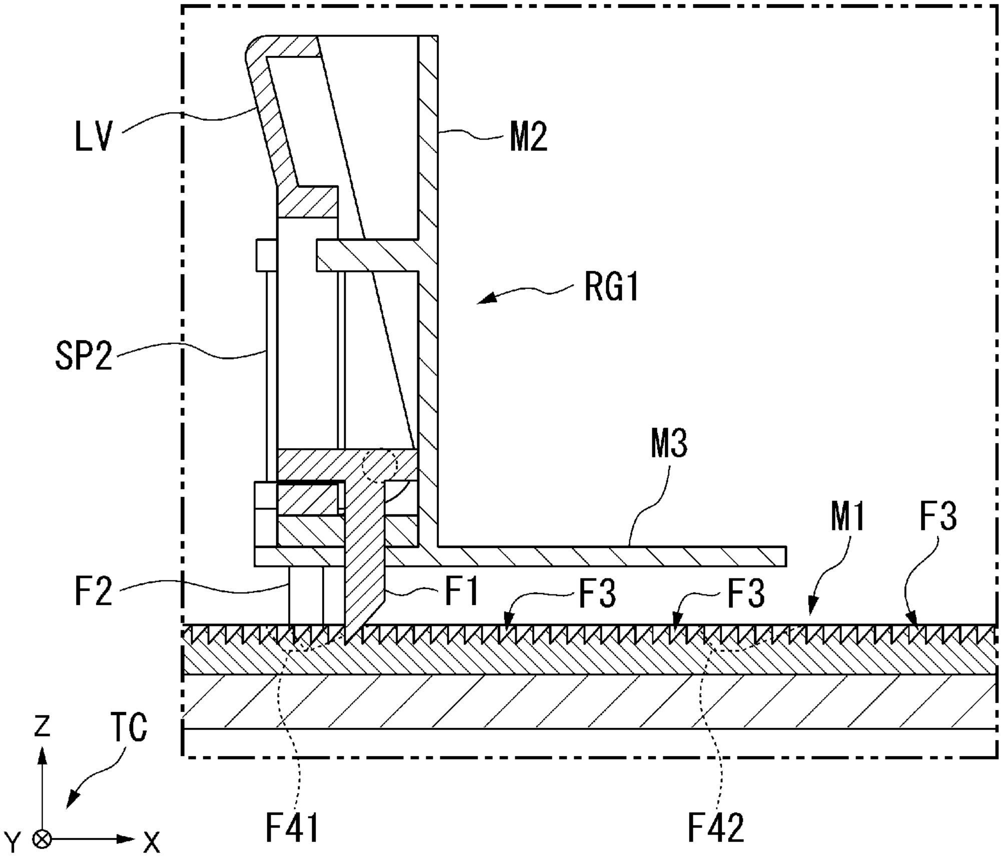
FIG. 15 is a side view illustrating an example of a state of the first restriction section RG1 immediately after the first restriction section RG1 illustrated in FIG. 13 is further moved toward the direction A11 while the second portion F2 is engaged with the fourth portion F43.

Here, as described above, the position of the end section that, among the end sections of the fourth portion F41, is at the direction A12 side assuming that the placement surface M1 is being viewed in the positive direction of the Y-axis, is the position where the end section on the direction A12 side of the second portion F2, whose tip is located at a position shifted from the A4 size position toward the direction A12 side by the absolute value of the cutting tolerance of the A4 size print medium, is located. For this reason, depending on the size of the cutting tolerance, the first plate-shaped member M2 of the first restriction section RG1 illustrated in FIG. 13 may not come into contact with the end section on the direction A12 side of the print medium among the end sections of the print medium placed at the placement position of the A4 size. In this case, by performing an operation of bringing the operation section LV close to the first plate-shaped member M2 again, the user can further move the first restriction section RG1 in the direction A11 while engagement of the second portion F2 with the fourth portion F41 is maintained as illustrated in FIG. 15. As described above, in the medium placement unit ST, the collision sound or the like between the second portion F2 and the fourth portion F41 is generated in order to prompt the user to move the first restriction section RG1 as fine adjustment of the position of the first restriction section RG1.

Figure 16:
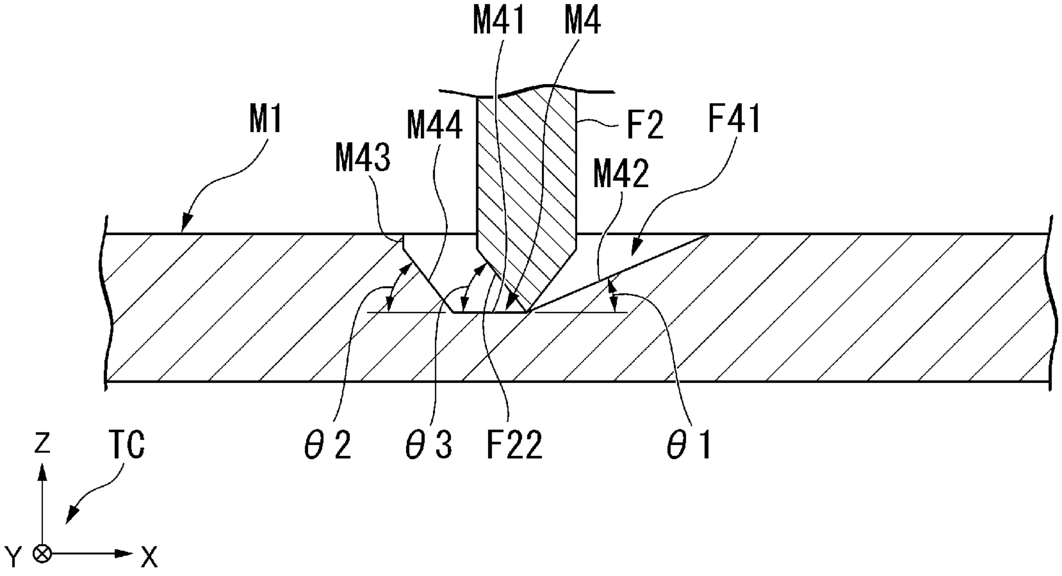
FIG. 16 is an enlarged side view of the periphery of the second portion F2 and the fourth portion F41 shown in FIG. 15.

FIG. 15 is a side view illustrating an example of a state of the first restriction section RG1 immediately after the first restriction section RG1 illustrated in FIG. 13 is further moved toward the direction A11 while the second portion F2 is engaged with the fourth portion F43. FIG. 16 is an enlarged side view of the periphery of the second portion F2 and the fourth portion F41 shown in FIG. 15. However, also in FIG. 14, in order to clearly show movement of the second portion F2, the placement surface M1 and the second plate-shaped member M3 are illustrated so as to be separated from each other.

In the example shown in FIGS. 15 and 16, in the first restriction section RG1, the tip of the second portion F2 is moving to the end section on the direction A11 side of the flat surface M41 of the fourth portion F41 while the second portion F2 is engaged with the fourth portion F41. Also in the example shown in FIG. 15, the user has released his/her hand from the operation section LV. Therefore, the operation section LV has moved in a direction separating from the first plate-shaped member M2 of the first restriction section RG1 by the resilient force of the first biasing member SP1, and the first portion F1 is lowered and engaged with the third portion F3. As a result, also in the above example, movement of the first restriction section RG1 is restricted in both the direction A11 and the direction A12. In this manner, in the medium placement unit ST, even when the user moves the first restriction section RG1 while the second portion F2 is engaged with the fourth portion F41, it is possible to restrict movement of the first restriction section RG1 with respect to the placement surface M1. This is because the pitch is less than or equal to the cutting tolerance of the print medium, and is shorter than the lengths of the fourth portions F41 in the direction A11. In other words, this is because when the placement surface M1 is viewed from the direction orthogonal to the placement surface M1, two or more third portions F3 of the plurality of third portions F3 are included in the range in which the first portion F1 can move while maintaining the state where the second portion F2 is engaged with the fourth portion F41. By this, even if the size of the print medium placed on the placement surface M1 differs from the A4 size due to cutting tolerance, the user can move the first restriction section RG1 to an appropriate position according to the size of the print medium, and can restrict movement of the first restriction section RG1 at that position. That is, the user can finely adjust the position of the first restriction section RG1. As a result, in the medium placement unit ST, it is possible to suppress the occurrence of skew, sheet feeding failure, and the like in the transport of the A4 size print medium among the print medium placed on the placement surface M1. Note that the user may perform fine adjustment of the position of the first restriction section RG1 without releasing his or her hand from the operation section LV, that is, while maintaining the state where the first portion F1 is raised with respect to the second plate-shaped member M3, or may perform fine adjustment of the position of the first restriction section RG1 while releasing his or her hand from the operation section LV, that is, while maintaining the state where the first portion F1 is lowered with respect to the second plate-shaped member M3.

Note that in the example illustrated in FIG. 16, in the fourth portion F41 described above, the incline angle θ1 of the first inclined surface M42 with respect to the flat surface M41 is smaller than the incline angle θ2 of the second inclined surface M44 with respect to the flat surface M41. That is, $\theta 1 < \theta\ 2$. By this, when the user moves the first restriction section RG1 toward the direction A11, the user can move the first restriction section RG1 with a smaller force than when moving the first restriction section RG1 toward the direction A12. In the fine adjustment of the position of the first restriction section RG1, this leads to improvement in convenience for the use because the frequency at which the user brings the first restriction section RG1 close to the print medium is higher than the frequency at which the user moves the first restriction section RG1 away from the print medium. Note that the incline angle of the first inclined surface M42 with respect to the flat surface M41 may be equal to or larger than the incline angle of the second inclined surface M44 with respect to the flat surface M41.

In the example shown in FIG. 16, the incline angle θ3 with respect to the flat surface M41 of surface F22 of the direction A12 side among the surfaces at the tip of the second portion F2 described above, is substantially equal to the incline angle θ2 described above except for deviation due to manufacturing tolerance or the like. By this, in the medium placement unit ST, the sound generated when the second portion F2 engages with the fourth portion F41, the vibration felt by the hand of the user in this case, and the like can be increased, and the sound, the vibration, and the like can be balanced with the load when the second portion F2 rises up from the flat surface M41 to the placement surface M1.

A configuration may be adopted in which a mark section is provided on the placement surface M1 described above, for marking a predetermined size position, such as a A4 size position, a letter size position, or a B5 size position. Here, the letter size position is a position corresponding to the print medium of the letter size. The B5 size position is a position corresponding to the B5 size print medium. The predetermined size position is a position corresponding to the print medium of the predetermined size. The first mark MK1 illustrated in FIG. 8 is an example of a mark section indicating the A4 size position. The second mark MK2 illustrated in FIG. 8 is an example of a mark section indicating the letter size position. The third mark MK3 illustrated in FIG. 8 is an example of a mark section indicating the B5 size position. As a result, in the medium placement unit ST, it is possible to visually check whether the size of the print medium has shifted from the predetermined size and, as a result, it is possible to prompt the user to finely adjust the position of the first restriction section RG1. Note that a configuration may be adopted in which some or all of these mark sections are not provided on the placement surface M1.

As described above, in this example, the configuration of the second restriction section RG2 is the same as the configuration of the first restriction section RG1. In this case, the placement surface M1 is provided with a plurality of third portions F3 that engage with the first portions F1 of the second restriction section RG2 and the three fourth portions F4 that engage with the second portions F2 of the second restriction section RG2. However, the plurality of third portions F3 that engage with the first portions F1 of the second restriction section RG2 and the three fourth portions F4 that engage with the second portions F2 of the second restriction section RG2 are arranged in the direction A21. The position of the end section on the direction A22 side of the fourth portion F4 when the placement surface M1 is viewed from the direction orthogonal to the placement surface M1 is different depending on whether the method of placing the print medium on the placement position is the offset method or the center arrangement method. The offset method is a method in which either the left or right edge of the edges that the placement positions of the print medium have is used as a reference, and the print medium is placed on the placement surface M1 with the edges of the print medium aligned with this reference. The center arrangement method is a method in which the print medium is placed on the placement surface M1 while aligning the center line of the placement surface M1 in the width direction and the center line of the print medium in the width direction. Note that the width direction is a direction orthogonal to the direction A11. For example, when the method of placing the print medium at the placement position is the offset method, the position of the end section of the fourth portion F41 that is on the direction A22 side, assuming that the placement surface M1 is viewed from the direction orthogonal to the placement surface M1, is the position that is shifted from the A4 size position to the direction A22 side by the cutting tolerance of the print medium or more, in a similar manner to the fourth portion F41 of the first restriction section RG1. On the other hand, for example, when the method of placing the print medium at the placement position is the center arrangement method, the position of the end section of the fourth portion F41 on the direction A22 side, assuming that the placement surface M1 is viewed from the direction orthogonal to the placement surface M1, is the position that is shifted from the A4 size position by half or more of the cutting tolerance of the print medium in the direction A22 because the tolerance is distributed to the left and right. Note that the placement surface M1 may not be provided with the plurality of third portions F3 that engage with the first portions F1 of the second restriction section RG2 and the three fourth portions F4 that engage with the second portions F2 of the second restriction section RG2. In this case, the placement surface M1 is provided with the plurality of third portions F3 that engage with the first portions F1 of the third restriction section RG3 and three fourth portions F4 that engage with the second portions F2 of the third restriction section RG3. In this case, unlike the first restriction section RG1, the second restriction section RG2 does not include the first portion F1 and the second portion F2.

As described above, in this example, the configuration of the third restriction section RG3 is the same as the configuration of the first restriction section RG1. In this case, the placement surface M1 is provided with the plurality of third portions F3 that engage with the first portions F1 of the third restriction section RG3 and three fourth portions F4 that engage with the second portions F2 of the third restriction section RG3. However, the plurality of third portions F3 that engage with the first portions F1 of the third restriction section RG3 and the three fourth portions F4 that engage with the second portions F2 of the third restriction section RG3 are arranged in the direction A31. The position of the end section on the direction A32 side of the fourth portion F4 when the placement surface M1 is viewed from the direction orthogonal to the placement surface M1 is different depending on whether the method of placing the print medium on the placement position is the offset method or the center arrangement method. For example, when the method of placing the print medium at the placement position is the offset method, the position of the end section of the fourth portion F41 that is on the direction A32 side when the placement surface M1 is viewed from the direction orthogonal to the placement surface M1 is the position that is shifted from the A4 size position to the direction A32 side by the cutting tolerance of the print medium or more in a manner similar to the fourth portion F41 of the first restriction section RG1. On the other hand, for example, when the method of placing the print medium at the placement position is the center arrangement method, the position of the end section of the fourth portion F41 on the direction A32 side when the placement surface M1 is viewed from the direction orthogonal to the placement surface M1 is the position that is shifted from the A4 size position by half or more of the cutting tolerance of the print medium in the direction A32 because the tolerance is distributed to the left and right. Note that the placement surface M1 may be a configuration not provided with the plurality of third portions F3 that engage with the first portions F1 of the third restriction section RG3 and the three fourth portions F4 that engage with the second portions F2 of the third restriction section RG3. In this case, the placement surface M1 is provided with a plurality of third portions F3 that engage with the first portions F1 of the second restriction section RG2 and the three fourth portions F4 that engage with the second portions F2 of the second restriction section RG2. In this case, unlike the first restriction section RG1, the third restriction section RG3 does not include the first portion F1 and the second portion F2.

MODIFICATIONS OF EMBODIMENT

Hereinafter, modifications of the embodiment will be described.

Figure 17:
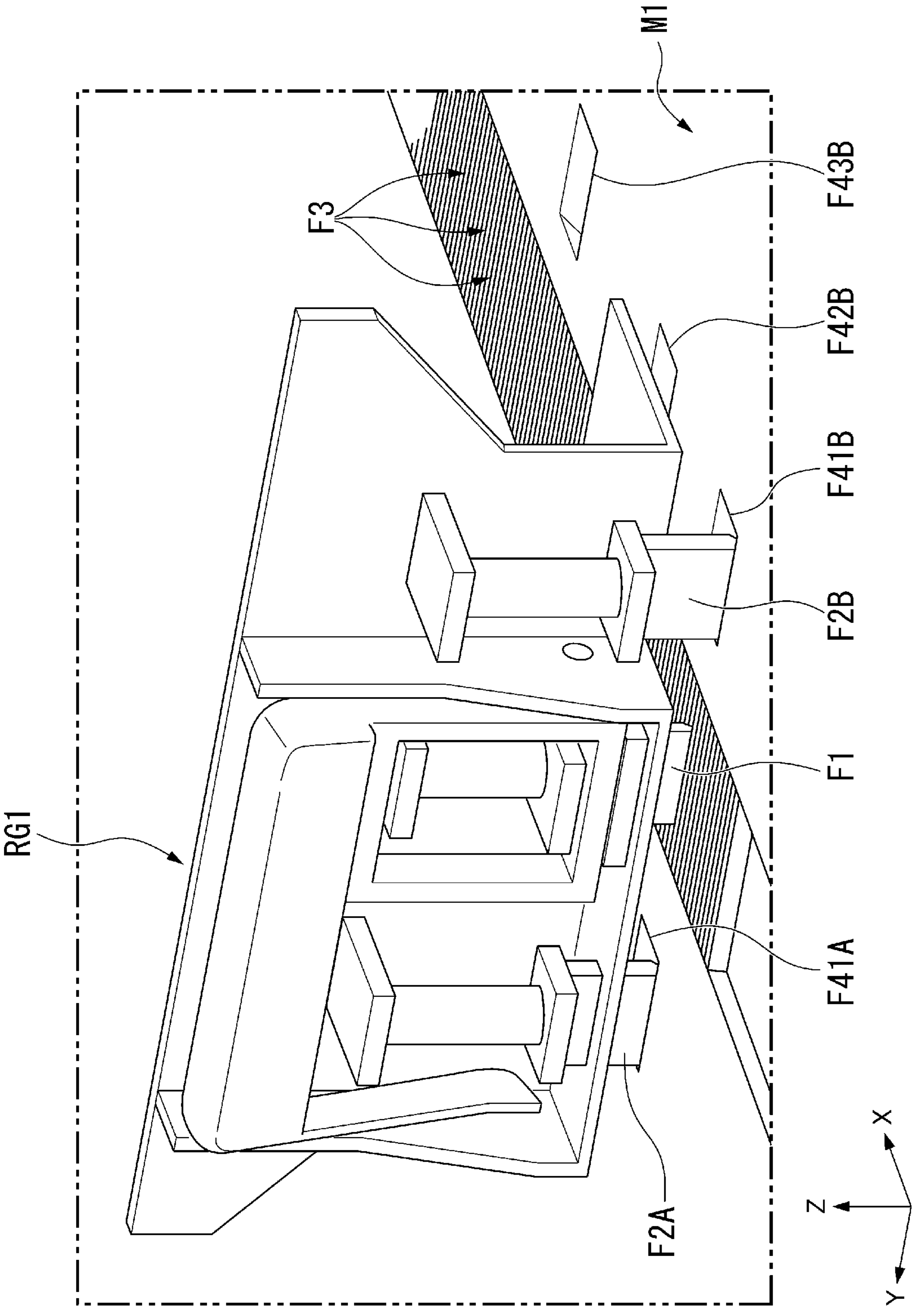
FIG. 17 is a view showing a modification of the configuration of the placement surface M1.

In the placement surface M1 shown in FIG. 8, the three fourth portions F4 are arranged toward the direction A11 out of the two adjacent sides of the plurality of third portions F3. However, as shown in FIG. 17, the fourth portion F4 may be configured to be arranged toward the direction A11 on both sides of the plurality of third portions F3. FIG. 17 is a view showing a modification of the configuration of the placement surface M1.

In the example illustrated in FIG. 17, the fourth portion F41, the fourth portion F42, and the fourth portion F43 are provided as the fourth portion F41A, the fourth portion F42A, and the fourth portion F43A and arranged toward the direction A11 next to the third portions F3 on, among both sides of the plurality of third portions F3, the positive direction side of the Y-axis. On the other hand, in the above-described example, the fourth portion F41, the fourth portion F42, and the fourth portion F43 are provided as the fourth portion F41B, the fourth portion F42B, and the fourth portion F43B and arranged toward the direction A11 next to the third portions F3 on, among both sides of the plurality of third portions F3, the negative direction side of the Y-axis. Here, when the placement surface M1 is viewed in the positive direction of the Y-axis, the fourth portion F41A and the fourth portion F41B overlap each other. When the placement surface M1 is viewed in the positive direction of the Y-axis, the fourth portion F42A and the fourth portion F42B overlap each other. When the placement surface M1 is viewed in the positive direction of the Y-axis, the fourth portion F43A and the fourth portion F43B overlap each other. For this reason, the first restriction section RG1 includes, as the second portion F2A, the second portion F2 that engages with each of the fourth portion F41A, the fourth portion F42A, and the fourth portion F43A and includes, as the second portion F2B, the second portion F2 that engages with each of the fourth portion F41B, the fourth portion F42B, and the fourth portion F43B. By this, in the medium placement unit ST, it is possible to increase sound, vibration, and the like generated when the second portion F2 engages with the fourth portion F4. As a result, in the medium placement unit ST, it is possible to more reliably notify the user that the first restriction section RG1 has reached the predetermined size position without making the user visually check the first restriction section RG1. In this case, in the medium placement unit ST, it is possible to increase force required for moving the first restriction section RG1 when it is engaged with the second portion F2. As a result, in the medium placement unit ST, it is possible to more reliably notify the user that the first restriction section RG1 is reaching the predetermined size position without making the user visually check the first restriction section RG1. Note that the relationship between the plurality of third portions F3 and the fourth portion F4 illustrated in FIG. 17 may be reversed. That is, a plurality of third portions F3 may be provided aligned adjacent to both sides of fourth portions F4 that are aligned toward the direction A11.

Figure 18:
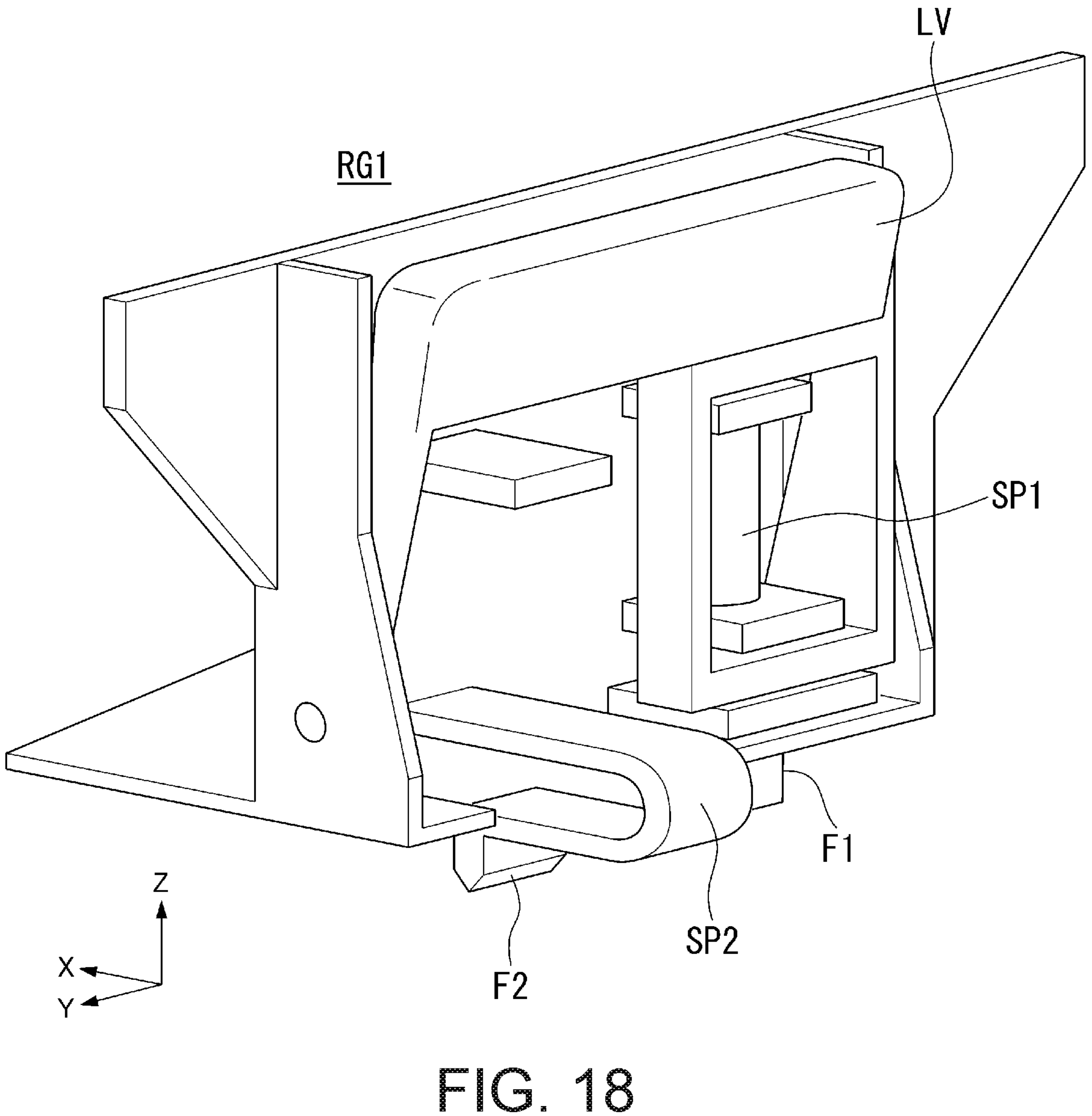
FIG. 18 is a view showing an example of the first restriction section RG1 including a leaf spring as the second biasing member SP2.

The first restriction section RG1 described above may be configured to include a leaf spring as the second biasing member SP2 as illustrated in FIG. 18, instead of the configuration including the coil spring. FIG. 18 is a view showing an example of the first restriction section RG1 including a leaf spring as the second biasing member SP2.

Figure 19:
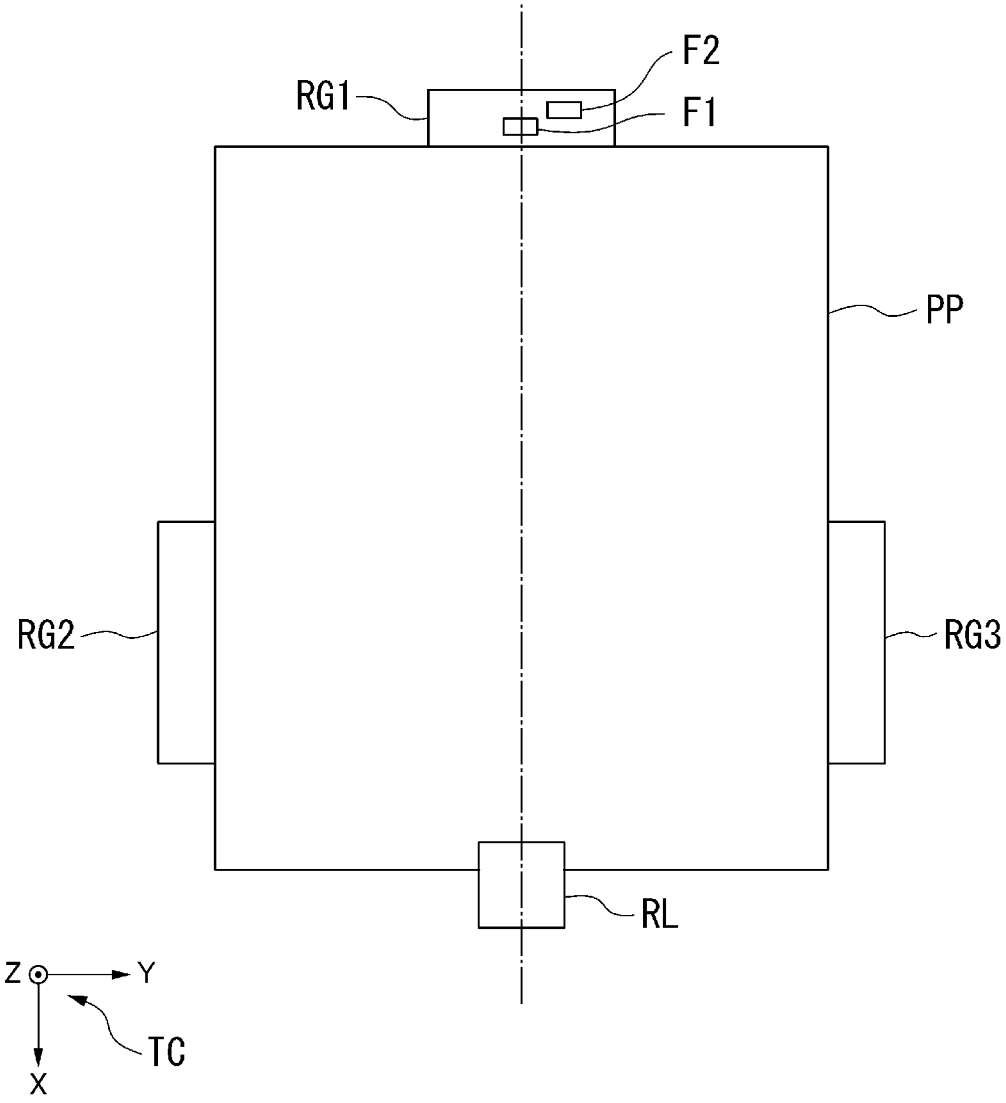
FIG. 19 is a diagram illustrating an example of the relative positional relationship between the print medium PP placed at a placement position on the placement surface M1 and each of the first restriction section RG1, the second restriction section RG2, and the third restriction section RG3.

In the example shown in FIG. 8, the plurality of third portions F3 are provided at the width direction center of the placement surface M1. Here, the center means a range including the center, for example, a range of at least about ±several millimeters from the center. In this case, as illustrated in FIG. 19, the first restriction section RG1 can restrict movement of the print medium PP at the width direction center of the end section on the direction A12 side, among the end sections of the print medium PP placed at the placement position on the placement surface M1. FIG. 19 is a diagram illustrating an example of the relative positional relationship between the print medium PP placed at a placement position on the placement surface M1 and each of the first restriction section RG1, the second restriction section RG2, and the third restriction section RG3. In the example shown in FIG. 19, the first restriction section RG1 restricts movement of the print medium PP at the width direction center. This is because, as shown in FIG. 19, the transport roller RL of the transport section CR that transports the print medium PP from the medium placement unit ST is located at the width direction center of the end section on the direction A11 side, among the end sections of the print medium PP. In this case, the print medium PP is transported substantially straight in the transport direction, that is, in the direction A11. This is because, in this case, the transport roller RL applies a transport force toward the transport direction at the width direction center of the print medium PP.

Here, when the plurality of third portions F3 are provided at the width direction center of the placement surface M1, the first portion F1 of the first restriction section RG1 is also positioned at the width direction center of the print medium PP. For this reason, the fulcrum of the first restriction section RG1 is located at the width direction center of the print medium PP, and as a result, it is possible to suppress skew of the print medium PP. Note that in this case, the second portion F2 of the first restriction section RG1 is located at a position shifted in the width direction from the width direction center of the print medium PP. Note that in FIG. 19, in order to clearly show the relative positions of the first restriction section RG1 and the second portion F1 of the first restriction section F2 with respect to the print medium PP, the first portion F1 and the second portion F2 are both shown as a quadrangular object.

When the print medium PP is transported substantially straight in the transport direction by the transport roller RL, moment that would rotate the print medium PP around the Z-axis is unlikely to be applied. Even if such moment is applied to the print medium PP, the second restriction section RG2 and the third restriction section RG3, which are positioned on both sides in the width direction of the print medium PP, can suppress rotation of the print medium PP around the Z-axis. As a result, the medium placement unit ST can suppress the occurrence of skew, paper feeding failure, and the like in the transport of the print medium PP. Note that in this case, it is desirable that the second restriction section RG2 and the third restriction section RG3 overlap each other as the placement surface M1 is viewed in the positive direction of the Y-axis. In this case, in the above-described case, it is desirable to adopt a configuration in which the third portions F3 and the fourth portions F4 for the second restriction section RG2 and the third restriction section RG3 are provided on the placement surface M1 such that the second restriction section RG2 and the third restriction section RG3 are positioned closer to the transport roller RL than is the first restriction section RG1. By this, the medium placement unit ST can suppress rotation of the print medium PP around the Z-axis in the vicinity of the transporting roller RL. As a result, the medium placement unit ST can more reliably suppress the occurrence of skew, paper feeding failure, and the like during transport of the print medium PP.

Figure 20:
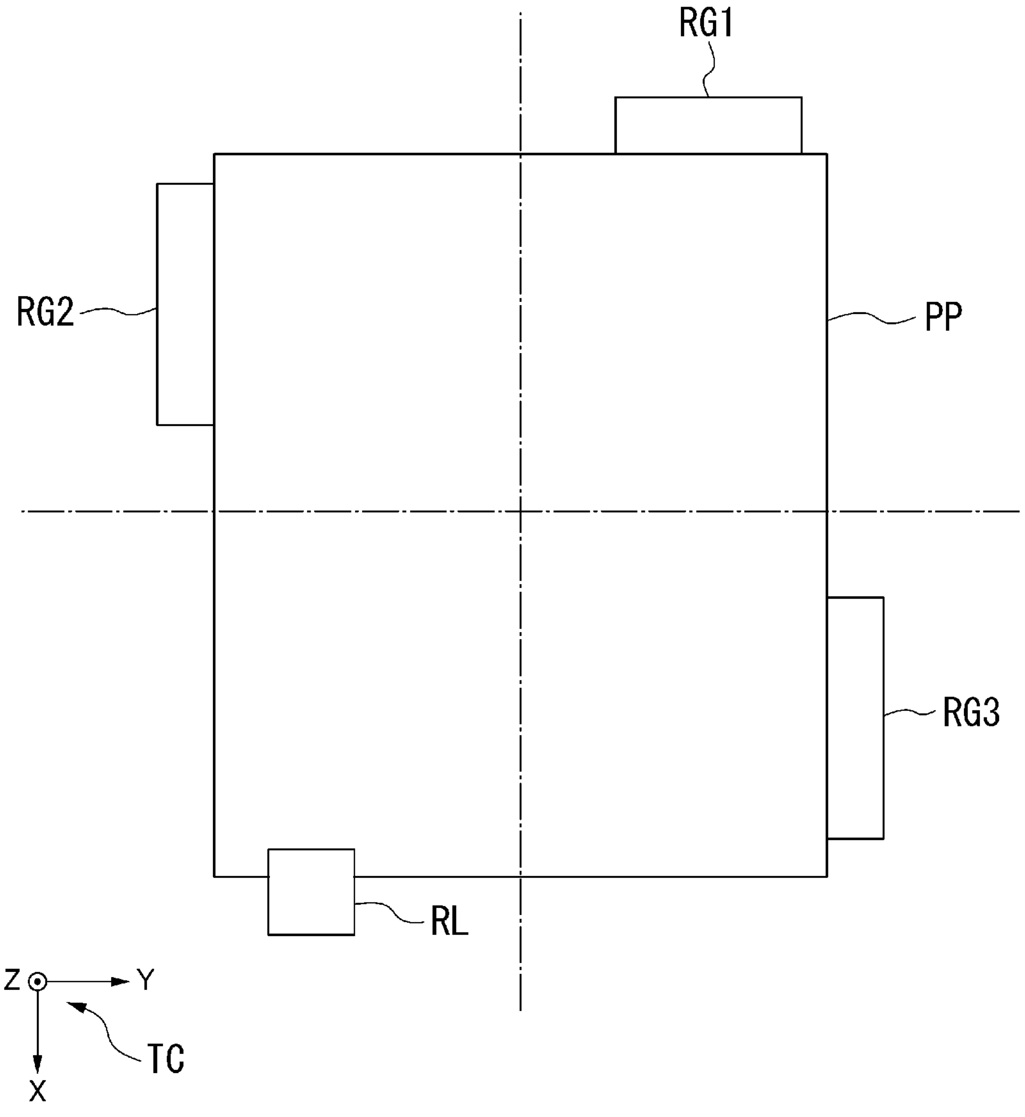
FIG. 20 is a diagram illustrating another example of the relative positional relationship between the print medium PP placed at a placement position on the placement surface M1 and each of the first restriction section RG1, the second restriction section RG2, and the third restriction section RG3.

On the other hand, as shown in FIG. 20, when the transport roller RL is located near the left end of the end section of the print medium PP on the direction A11 side, it is desirable that the first restriction section RG1 be located near the right end of the end section of the print medium PP on the direction A12 side, among the end sections of the print medium PP. FIG. 20 is a diagram illustrating another example of the relative positional relationship between the print medium PP placed at a placement position on the placement surface M1 and each of the first restriction section RG1, the second restriction section RG2, and the third restriction section RG3. Here, the left end of the end section on the direction A11 side, among the end sections of the print medium PP, is the end section on the negative direction side of the Y-axis, among both ends in the width direction of the end section. The right end of the end section on the direction A12 side, among the end sections of the print medium PP, is an end section on the positive direction side of the Y-axis, among both ends in the width direction of the end section. This is because, when the transport roller RL is located near the left end, moment is applied to the print medium PP to rotate the print medium PP counterclockwise around the Z-axis, as the placement surface M1 is viewed in the negative direction of the Z-axis. When the first restriction section RG1 is located near the right end, the rotation of the print medium PP due to moment can be suppressed. Similarly, when it is located near the left end of the end section of the print medium PP on the direction A11 side, among end sections of the print medium PP, the second restriction section RG2 is desirably located near the left end of the end section of the print medium PP on the direction A22 side, among the end sections of the print medium PP. The left end of the end section on the direction A22 side, among the end sections of the print medium PP, is an end section on the negative direction side of the X-axis, among both ends of the end sections in the transport direction. By this, the second restriction section RG2 can suppress rotation of the print medium PP due to moment. When it is located near the left end of the end section of the print medium PP on the direction A11 side, among the end sections of the print medium PP, the third restriction section RG3 is desirably located near the left end of the end section of the print medium PP on the direction A32 side, among the end sections of the print medium PP. The left end of the end section on the direction A32 side, among the end sections of the print medium PP, is an end section on the positive direction side of the X-axis, among both ends of the end sections in the transport direction. By this, the third restriction section RG3 can suppress rotation of the print medium PP due to moment. With such a configuration, even when it is located near the left end of the end section on the direction A11 side, among the end sections of the print medium PP, the medium placement unit ST can suppress rotation of the print medium PP around the Z-axis near the transport roller RL. As a result, the medium placement unit ST can more reliably suppress the occurrence of skew, paper feeding failure, and the like during transport of the print medium PP.

The first portion F1 may be a concave-shaped portion. In this case, each of the plurality of third portions F3 is a convex-shaped portion.

The second portion F2 may be a concave-shaped portion. In this case, the fourth portion F4 is a convex-shaped portion.

A configuration may be adopted in which, among positions on the placement surface M1 as the placement surface M1 is viewed toward the positive direction of the Y-axis, the plurality of third portions F3 are provided in a range overlapping the fourth portion F4 or the periphery thereof and are not provided in positions other than the range or the periphery thereof. In this case, for example, a surface on which the third portions F3 are not provided is intermittently provided in a region in which the third portions F3 are arranged, among the regions on the placement surface M1. The surface is, for example, a flat surface, but is not limited thereto.

Note that the matters described above may be combined in any way.

The combination of the first restriction section RG1 and the placement surface M1 in the medium placement unit ST described above may be, instead of a configuration used as a paper feed cassette of the printing device 1, a configuration used in a manual insertion path or the like of a printing device, may be a configuration used in auto document feeders of scanners, or may be a configuration applied to other apparatuses that transport medium. When the combination is used in an auto-document feeder of a scanner, the medium placed on the placement surface M1 of the medium placement unit ST include, but are not limited to, documents for image reading.

The medium placement unit ST described above may be configured as a transport device together with the transport section CR which transports the medium. In addition, instead of the configuration in which the transport device is provided in the printing device 1, the transport device may be provided in another electronic apparatus, such as a scanner, that performs various processes using a medium which is placed on the medium placement unit ST.

As described above, the medium placement unit ST according to the embodiment includes a placement surface M1 on which a print medium is placed and a first restriction section RG1 that is movable relative to the placement surface M1 both in the direction A11, in which the restriction section approaches the medium placed on the placement surface M1, and the direction A12 opposite to the direction A11, and that restricts movement of the print medium placed on the placement surface M1 by engaging with the placement surface M1, wherein the first restriction section RG1 includes a first portion F1 and a second portion F2 and engages with the placement surface M1 via the first portion F2 and the second portion F1, the placement surface M1 is provided with a plurality of third portions F3 arranged in parallel with the direction A11 and a fourth portion F41, when any of the plurality of third portions F3 engages with the first portion F1, then movement of the first restriction section RG1 is restricted in the direction A11 and in the direction A12, the fourth portion F41 engages with the second portion F2, in the state in which the second portion F2 is engaged with the fourth portion F41, when the third portion F31 of the plurality of third portions F3 is engaged with the first portion F1, the first restriction section RG1 provided at the A4 size position can change the third portion F3 engaged with the first portion F1 to the third portion F32, which is, of the plurality of third portions F3, the one positioned adjacent to the third portion F31, while maintaining the state in which the second portion F2 is engaged with the fourth portion F41. By this, in the medium placement unit ST, it is possible to suppress the occurrence of skew, sheet feeding failure, and the like in the transport of the A4 size print medium among the print medium placed on the placement surface M1.

Notes

1) A medium placement unit including a placement surface on which a medium is placed and a restriction section that is movable relative to the placement surface in both a first direction, in which the restriction section approaches the medium placed on the placement surface, and in a second direction opposite to the first direction, and that restricts movement of the medium placed on the placement surface by engaging with the placement surface, wherein the restriction section includes a first portion and a second portion and is engageable with the placement surface via at least one of the first portion and the second portion, the placement surface is provided with a plurality of third portions arranged in parallel with the first direction and a fourth portion, each of the plurality of third portions is engageable with the first portion and restricts movement of the restriction section in the first direction and in the second direction when engaged with the first portion, the fourth portion is engageable with the second portion, and is provided at a position corresponding to a medium of a predetermined size, and the restriction section is configured to, when one third portion of the plurality of third portions is engaged with the first portion in a state where the second portion is engaged with the fourth portion, switch the third portion that is engaged with the first portion for a third portion adjacent to the one third portion of the plurality of third portions, while maintaining the state where the second portion is engaged with the fourth portion.

2) The medium placement unit according to 1), wherein the first portion and the second portion are convex-shaped portions protruding toward the placement surface, each of the plurality of third portions is a concave-shaped portion into which is fitted the convex-shaped first portion, and the fourth portion is a concave-shaped portion which extends in parallel to the first direction and into which the second portion is insertable.

3) The medium placement unit according to either 1) or 2), wherein a distance between adjacent third portions of the plurality of third portions is equal to or less than a cutting tolerance of the medium.

4) The medium placement unit according to any one of 1) to 3), wherein a length of the fourth portion in the first direction is longer than a length of the second portion in the first direction and when the placement surface is viewed from the direction orthogonal to the placement surface, two or more third portions of the plurality of third portions are included in a range in which the first portion is movable while maintaining the state where the second portion is engaged with the fourth portion.

5) The medium placement unit according to 4), wherein the fourth portion has a contact surface that contacts the second portion in a state where the fourth portion is engaged with the second portion, the contact surface includes a flat surface parallel to the placement surface, and when the placement surface is viewed from a direction orthogonal to the placement surface, two or more third portions are included in a range in which the first portion is movable while maintaining a state in which the second portion contacts the flat surface.

6) The medium placement unit according to 5), wherein the contact surface includes a first inclined surface connecting the flat surface and the placement surface in the first direction and a second inclined surface connecting the flat surface and the placement surface in the second direction and an incline angle of the first inclined surface with respect to the flat surface is smaller than an incline angle of the second inclined surface with respect to the flat surface.

7) The medium placement unit according to 5), wherein the second portion is a convex-shaped portion that protrudes toward the placement surface, a surface in the second direction among surfaces of a tip of the convex-shaped second portion is a third inclined surface inclined so as to separate from the placement surface toward the second direction, the contact surface includes a first inclined surface connecting the flat surface and the placement surface in the first direction, a vertical surface extending vertically from the placement surface toward the contact surface, and a second inclined surface connecting the flat surface and the vertical surface in the second direction, an incline angle of the first inclined surface with respect to the flat surface is smaller than an incline angle of the second inclined surface with respect to the flat surface, and an incline angle of the third inclined surface with respect to the flat surface is substantially equal to an incline angle of the second inclined surface with respect to the flat surface.

8) The medium placement unit according to any one of 5) to 7), wherein when the restriction section is positioned at the position where movement of the medium having the predetermined size is restricted, the tip of the second portion contacts the center of the flat surface in the first direction.

9) The medium placement unit according to any one of 5) to 8), wherein when the restriction section is positioned at a position at which is restricted a medium that is larger than the medium of the predetermined size due to a cutting tolerance, the tip of the second portion contacts a position among positions on the contact surface that is further in the second direction than is the center of the flat surface in the first direction.

10) The medium placement unit according to any one of 1) to 9), wherein the first portion and the second portion are convex-shaped portions protruding toward the placement surface, a surface in the first direction among surfaces of a tip of the convex-shaped first portion is a surface inclined so as to separate from the placement surface toward the first direction, a surface in the second direction among surfaces of the tip of the convex-shaped first portion is a surface orthogonal to the placement surface, a surface in the first direction among surfaces of a tip of the convex-shaped second portion is a third inclined surface inclined so as to separate from the placement surface toward the first direction, and a surface in the second direction among surfaces of the tip of the convex-shaped second portion is a fourth inclined surface inclined so as to separate from the placement surface toward the second direction.

11) The medium placement unit according to any one of 1) to 10), wherein the placement surface includes a mark section that marks a position corresponding to the medium of the predetermined size.

12) The medium placement unit according to any one of 1) to 11), wherein at least one of the first portion and the second portion is biased in a direction of protruding toward the placement surface.

13) The medium placement unit according to any one of 1) to 11), wherein the restriction section includes an operation section configured to change a projection amount of the first portion in accordance with a received operation.

14) The medium placement unit according to 13), wherein the first portion is located further in the first direction than is the second portion.

15) The medium placement unit according to any one of 1) to 14), further including a housing configured to accommodate the medium placed on the placement surface as a print medium and that is attachable to and detachable from a printing device that performs printing on the print medium.

16) A transport device including the medium placement unit according to any one of 1) to 14) and a transport section that transports the medium placed on the placement surface of the medium placement unit in a transport direction, wherein the first direction is the transport direction.

17) The transport device according to 16), wherein the transport section applies a transport force to a center of the medium in a width direction, which intersects the transport direction, the first portion is positioned at the center of the medium in the width direction, and the second portion is located at a position shifted in the width direction from the center of the medium in the width direction.

18) A transport device including the medium placement unit according to any one of 1) to 14) and a transport section that transports the medium placed on the placement surface of the medium placement unit in a transport direction, wherein the first direction is a direction intersecting with the transport direction.

19) A printing device including the medium placement unit according to any one of 1) to 14) and a transport section that transports the medium placed on the placement surface of the medium placement unit as a print medium; and a printing section configured to perform printing on the print medium transported by the transport device.

Although the embodiments of the present disclosure have been described in detail with reference to the drawings, specific configurations are not limited to the embodiments, and changes, substitutions, deletions, and the like may be made without departing from the gist of the present disclosure.

What is claimed is:

1. A medium placement unit comprising:

a placement surface on which a medium is placed, and a restriction section that is movable relative to the placement surface in both a first direction, in which the restriction section approaches the medium placed on the placement surface, and in a second direction opposite to the first direction, and that restricts movement of the medium placed on the placement surface by engaging with the placement surface, wherein the restriction section includes a first portion and a second portion, and is engageable with the placement surface via at least one of the first portion and the second portion, the placement surface is provided with a plurality of third portions arranged in parallel with the first direction and a fourth portion, the first portion is engageable with each of the plurality of third portions, and when engaged with a third portion, movement of the restriction section in the first direction and in the second direction is restricted, the second portion is engageable with the fourth portion, the fourth portion has a contact surface that contacts the second portion in a state where the fourth portion is engaged with the second portion, the contact surface includes a flat surface parallel to the placement surface, when the placement surface is viewed from a direction orthogonal to the placement surface, two or more third portions of the plurality of third portions are included in a range in which the first portion is movable while maintaining a state in which the second portion contacts the flat surface, the fourth portion is provided at a position corresponding to a predetermined size of the medium, and the restriction section is configured to, when the first portion and the third portion are engaged in a state where the second portion and the fourth portion are engaged, enable to switch, via a user operation, the third portion that is engaged with the first portion while maintaining the state where the second portion and the fourth portion are engaged.

2. The medium placement unit of claim 1, wherein a length of the fourth portion in the first direction is longer than a length of the second portion in the first direction.

3. The medium placement unit of claim 2, wherein the contact surface includes a first inclined surface connecting the flat surface and the placement surface in the first direction and a second inclined surface connecting the flat surface and the placement surface in the second direction, and an incline angle of the first inclined surface with respect to the flat surface is smaller than an incline angle of the second inclined surface with respect to the flat surface.

4. The medium placement unit of claim 2, wherein the second portion is a convex-shaped portion that protrudes toward the placement surface, a surface in the second direction among surfaces of a tip of the convex-shaped portion is a third inclined surface inclined so as to separate from the placement surface toward the second direction, the contact surface includes a first inclined surface connecting the flat surface and the placement surface in the first direction, a vertical surface extending vertically from the placement surface toward the contact surface, and a second inclined surface connecting the flat surface and the vertical surface in the second direction, an incline angle of the first inclined surface with respect to the flat surface is smaller than an incline angle of the second inclined surface with respect to the flat surface, and an incline angle of the third inclined surface with respect to the flat surface is substantially equal to the incline angle of the second inclined surface with respect to the flat surface.

5. The medium placement unit of claim 2, wherein when the restriction section is positioned at a position where movement of the medium having the predetermined size is restricted, a tip of the second portion contacts a center of the flat surface in the first direction.

6. The medium placement unit of claim 2, wherein when the restriction section is positioned at a position at which is restricted a medium that is larger than the medium of the predetermined size due to a cutting tolerance, a tip of the second portion contacts a position among positions on the contact surface that is further in the second direction than is a center of the flat surface in the first direction.

7. The medium placement unit of claim 1, wherein the restriction section includes an operation section configured to change a projection amount of the first portion in accordance with the user operation.

8. The medium placement unit of claim 7, wherein the first portion is located further in the first direction than is the second portion.

9. A transport device comprising:

the medium placement unit of claim 1, and a transport section that transports the medium placed on the placement surface of the medium placement unit in a transport direction, wherein the first direction is the transport direction.

10. The transport device of claim 9, wherein the transport section applies a transport force to a center of the medium in a width direction, which intersects the transport direction, the first portion is positioned at the center of the medium in the width direction, and the second portion is located at a position shifted in the width direction from the center of the medium in the width direction.

11. The medium placement unit of claim 1, wherein the restriction section is configured to, when the first portion and one third portion of the plurality of third portions are engaged in the state where the second portion and the fourth portion are engaged, enable to switch, via the user operation, the third portion that is engaged with the first portion for the third portion adjacent to the one third portion of the plurality of third portions while maintaining the state where the second portion and the fourth portion are engaged.

12. The medium placement unit of claim 1, wherein the first portion is a first convex-shaped portion protruding toward the placement surface, the second portion is a second convex-shaped portion protruding toward the placement surface, the each of the plurality of third portions is a first concave-shaped portion into which is fitted the first convex-shaped portion, and the fourth portion is a second concave-shaped portion which extends in parallel to the first direction and into which the second portion is insertable.

13. The medium placement unit of claim 1, wherein a distance between adjacent third portions of the plurality of third portions is equal to or less than a cutting tolerance of the medium.

14. The medium placement unit of claim 1, wherein the first portion is a first convex-shaped portion protruding toward the placement surface the second portion is a second convex-shaped portion protruding toward the placement surface, a surface in the first direction among surfaces of a tip of the first convex-shaped portion is a surface inclined so as to separate from the placement surface toward the first direction, a surface in the second direction among the surfaces of the tip of the first convex-shaped portion is a surface orthogonal to the placement surface, a surface in the first direction among surfaces of a tip of the second convex-shaped portion is a third inclined surface inclined so as to separate from the placement surface toward the first direction, and a surface in the second direction among the surfaces of the tip of the second convex-shaped portion is a fourth inclined surface inclined so as to separate from the placement surface toward the second direction.

15. The medium placement unit of claim 1, wherein the placement surface includes a mark section that marks a position corresponding to the medium of the predetermined size.

16. The medium placement unit of claim 1, wherein at least one of the first portion and the second portion is biased in a direction of protruding toward the placement surface.

17. The medium placement unit of claim 1, further comprising:

a housing configured to accommodate the medium placed on the placement surface as a print medium, and that is attachable to and detachable from a printing device that performs printing on the print medium.

18. A transport device comprising:

the medium placement unit of claim 1, and a transport section that transports the medium placed on the placement surface of the medium placement unit in a transport direction, wherein the first direction is a direction intersecting with the transport direction.

19. A printing device comprising:

the medium placement unit of claim 1;

a transport section that transports the medium placed on the placement surface of the medium placement unit as a print medium; and a printing section configured to perform printing on the print medium transported by the transport section.

* * * * *